US 9,453,960 B2

(12) United States Patent
Momose et al.

(10) Patent No.: US 9,453,960 B2
(45) Date of Patent: Sep. 27, 2016

(54) DISPLAY DEVICE, ELECTRONIC APPARATUS AND ILLUMINATION DEVICE

(75) Inventors: Yoichi Momose, Matsumoto (JP); Nobutaka Urano, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 88 days.

(21) Appl. No.: 13/543,192

(22) Filed: Jul. 6, 2012

(65) Prior Publication Data

US 2013/0016524 A1  Jan. 17, 2013

(30) Foreign Application Priority Data

Jul. 11, 2011 (JP) .................................. 2011-152736
Dec. 1, 2011 (JP) .................................. 2011-263435
Dec. 1, 2011 (JP) .................................. 2011-263436

(51) Int. Cl.
F21V 7/04 (2006.01)
F21V 8/00 (2006.01)
G02F 1/1333 (2006.01)
G02F 1/1335 (2006.01)

(52) U.S. Cl.
CPC ....... *G02B 6/0085* (2013.01); *G02F 1/133308* (2013.01); *G02B 6/009* (2013.01); *G02F 1/133615* (2013.01); *G02F 2001/133628* (2013.01)

(58) Field of Classification Search
CPC  G02B 6/0085; G02B 6/0088; G02B 6/0091; G02B 6/0093; G02B 6/0011; G02F 1/133615
USPC ......... 362/633, 611, 612–613, 616, 623–624
See application file for complete search history.

(56) References Cited

U.S. PATENT DOCUMENTS 7,798,701 B2    9/2010  Mori et al.
7,850,360 B2 *  12/2010  Park et al. .................... 362/633
(Continued)

FOREIGN PATENT DOCUMENTS

CN      101975376 A  *  2/2011  ....... G02F 1/133603
JP      A-2001-27757     1/2001
(Continued)

OTHER PUBLICATIONS

Espacenet Enaglish translation of CN 101975376 A, Que, Feb. 16, 2011.*
(Continued)

*Primary Examiner* — Jason Moon Han
*Assistant Examiner* — Omar Rojas Cadima
(74) *Attorney, Agent, or Firm* — Oliff PLC

(57) ABSTRACT

An illumination device of a display device is configured such that heat of light-emitting elements is dissipated via a light source substrate, a light source support member made of a metal, and a first frame made of a metal. The illumination device also includes a second frame made of a resin that is disposed such that a closed space is formed along the light source support member between the frame and the light source support member. The second frame has an opening portion that communicates with the closed space, and the first frame and a third frame each has an opening portion at a position that overlaps the opening portion of the second frame, thereby allowing heat of the light-emitting elements to be dissipated through the closed space and an opening which is formed by opening portions.

18 Claims, 12 Drawing Sheets

(56) References Cited

U.S. PATENT DOCUMENTS

| | | | |
|---|---|---|---|
| 7,896,536 B2* | 3/2011 | Arita et al. | 362/633 |
| 7,903,197 B2* | 3/2011 | Koganezawa | 349/65 |
| 8,608,346 B2* | 12/2013 | Wang et al. | 362/294 |
| 2007/0247870 A1 | 10/2007 | Sakai et al. | |
| 2009/0002593 A1* | 1/2009 | Tanaka | G02B 6/0031 349/58 |
| 2009/0096957 A1 | 4/2009 | Hiyama et al. | |
| 2009/0128732 A1* | 5/2009 | Hamada | G02B 6/0068 349/58 |
| 2009/0231264 A1* | 9/2009 | Hatakeyama | G02B 6/0091 345/102 |
| 2009/0237957 A1 | 9/2009 | Tsubaki | |
| 2011/0037920 A1 | 2/2011 | Kim et al. | |
| 2011/0085342 A1* | 4/2011 | Horng | G02F 1/133602 362/382 |
| 2011/0090426 A1* | 4/2011 | Choi | G02B 6/009 349/65 |
| 2012/0062816 A1 | 3/2012 | Tsubaki | |
| 2013/0016524 A1 | 1/2013 | Momose et al. | |
| 2014/0286053 A1 | 9/2014 | Momose et al. | |

FOREIGN PATENT DOCUMENTS

| | | |
|---|---|---|
| JP | A-2002-229022 | 8/2002 |
| JP | 2006-208723 A | 8/2006 |
| JP | 2007-311327 A | 11/2007 |
| JP | A-2009-3081 | 1/2009 |
| JP | 2009-98309 A | 5/2009 |
| JP | 2009-98310 A | 5/2009 |
| JP | 2009-224301 A | 10/2009 |
| JP | A-2011-40388 | 2/2011 |
| JP | 2013-37332 A | 2/2013 |

OTHER PUBLICATIONS

Feb. 25, 2016 Office Action Issued in U.S. Appl. No. 14/295,700.

* cited by examiner

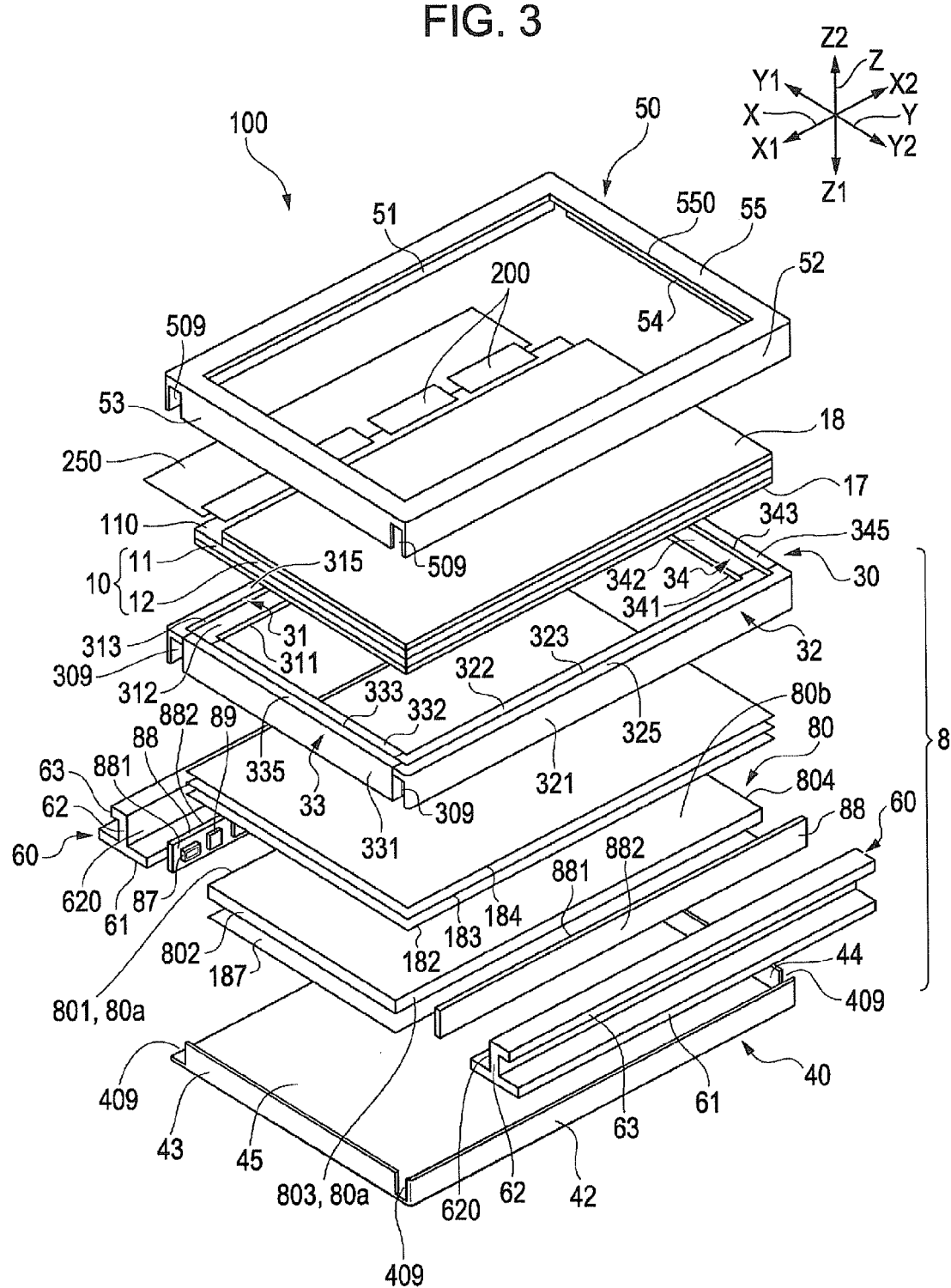

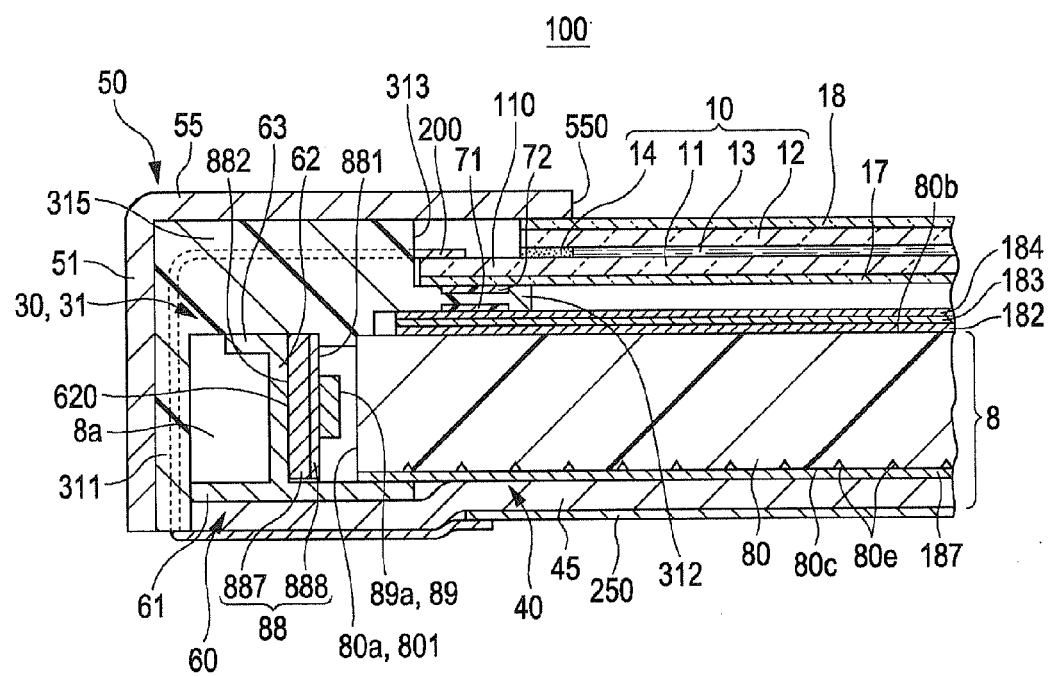
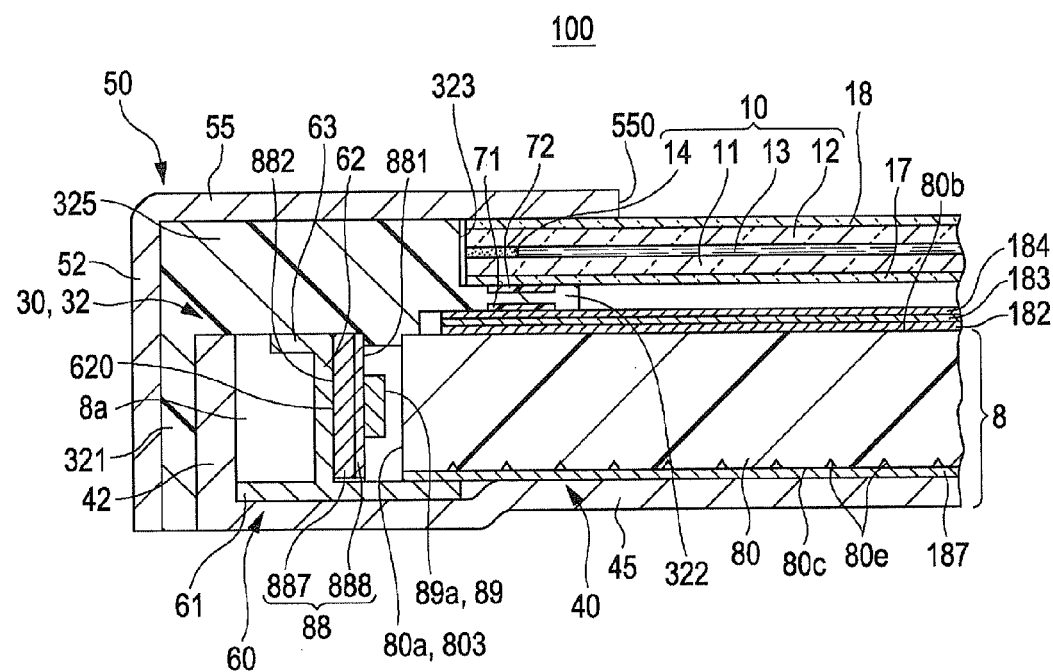

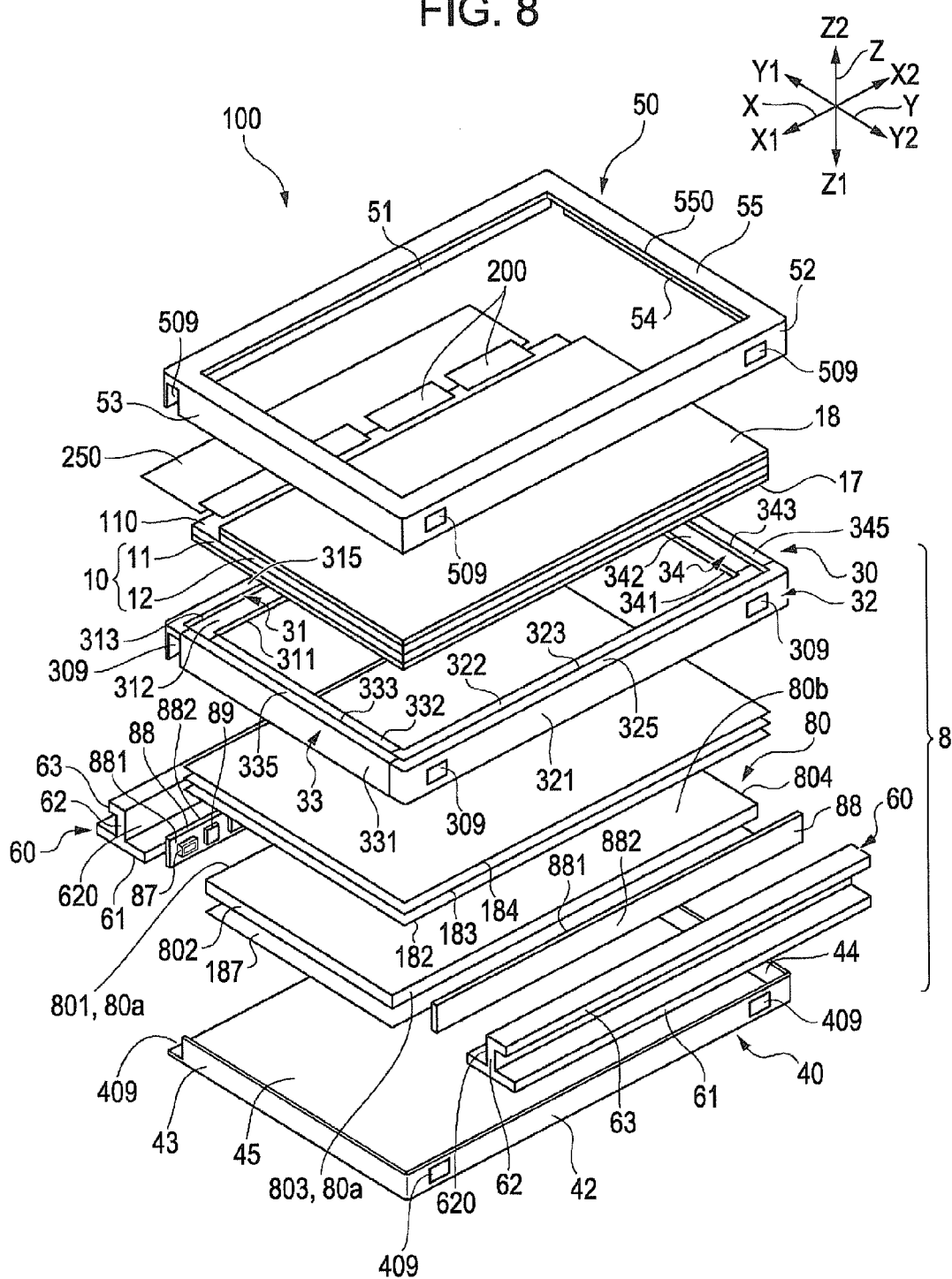

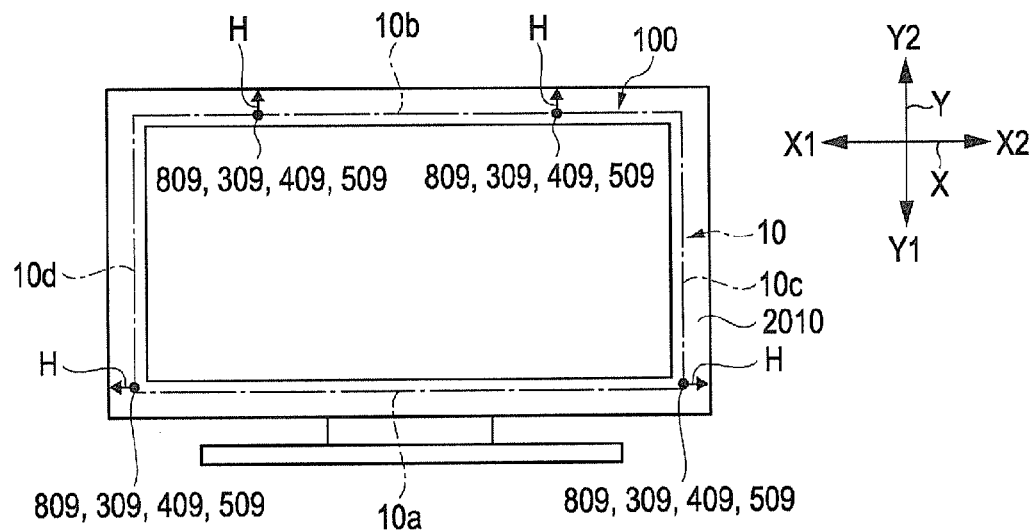
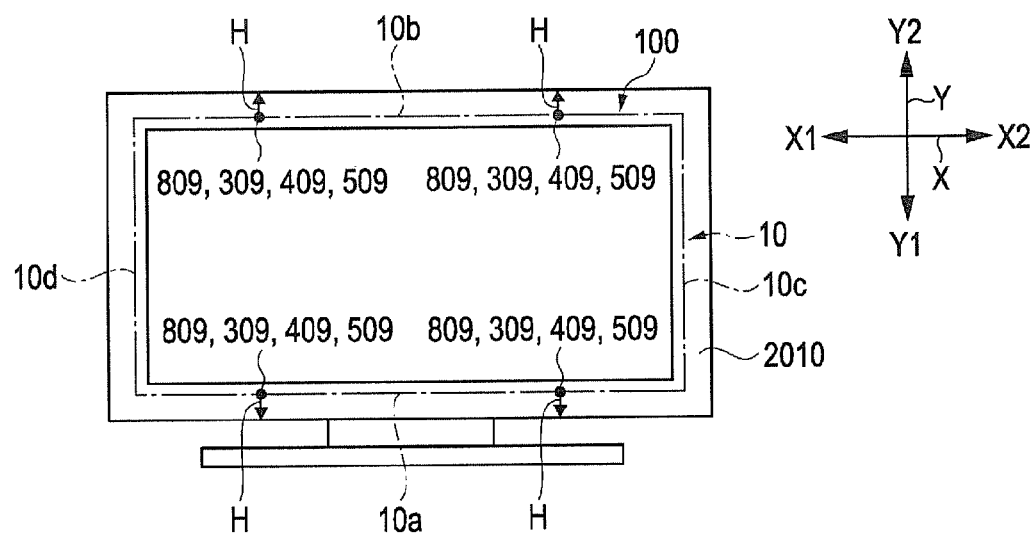

DISPLAY DEVICE, ELECTRONIC APPARATUS AND ILLUMINATION DEVICE

BACKGROUND

1. Technical Field

The present invention relates to a display device having an illumination device and a display panel, an electronic apparatus having a display device, and the illumination device.

2. Related Art

A liquid crystal device, which is one of the various display devices, includes an illumination device which is called a backlight unit, and a transmissive type or semi-transmissive type display panel (liquid crystal panel) that is disposed on a light exiting surface of the illumination device. In the illumination device, a plurality of light-emitting elements are arranged along the side end face of the light guide plate which serves as a light incident portion, as described in JP-A-2002-229022, JP-A-2009-3081 and JP-A-2011-40388.

In the illumination device having such a configuration, as the temperature of the light-emitting elements increases, the light-emitting elements have problems such as a decrease of light-emitting efficiency, ununiform brightness, and short product life. Accordingly, it is desirable to provide a light source support member made of a metal on the light source substrate on which the light-emitting elements are mounted so as to release heat via the light source support member.

When the illumination device is assembled, when a unit of illumination device is mounted on the apparatus, or when the display panel is provided on the illumination device to form a display device, it is desirable to accommodate the light source support member or the light guide plate in a frame. Such a frame generally includes, at least in part, an end plate that covers the upper side of the light source support member, and a side plate that surrounds the outer side of the light source support member and the light guide plate. The use of such a frame can improve the efficiency of assembling the device as well as the positional accuracy between the components, since positioning sections for various components can be easily provided on the frame.

However, the use of a frame has a problem that dissipation of heat from the light-emitting elements is lowered, in spite of the fact that dissipation of heat from the light-emitting elements is important in the illumination device.

SUMMARY

An advantage of some aspects of the invention is that a display device including a frame that enables efficient heat release from the light-emitting elements, regardless of whether the frame is disposed so as to surround the light-emitting elements and the light guide plate, and an electronic apparatus having the display device, and the illumination device are provided.

According to an aspect of the invention, a display device having an illumination device and a display panel that is disposed on a light exiting surface of the illumination device, the illumination device includes a light guide plate, a plurality of light-emitting elements that have a light-emitting surface oriented to a side end face of the light guide plate which serves as a light incident portion and are arranged along the light incident portion, a light source substrate that extends along the light incident portion and has the plurality of light-emitting elements mounted on one side thereof, a light source support member made of a metal that extends along the light incident portion and has a substrate holding surface which is in surface contact with the other side of the light source substrate, and a frame that is disposed on the outer side of the light source support member and the light guide plate and has a side plate such that a closed space is formed along the light source support member between the frame and the light source support member, wherein the illumination device has an opening through which the closed space communicates with an outside of the illumination device, the opening being formed by at least one opening portion.

Accordingly, in the illumination device, a plurality of light-emitting elements are arranged along the light incident portion of the light guide plate, and a plurality of light-emitting elements are mounted on one side of the light source substrates that extends along the light incident portion. In addition, the light source support member made of a metal is further disposed on the other side of the light source substrate, thereby allowing heat from the light-emitting elements to be released via the light source substrate and the light source support member. Further, in this invention, the frames having side plates are used for the purpose of improving the efficiency of assembling and the positional accuracy between the components. In addition to that, the illumination device has the opening through which the closed space communicates to the outside of the illumination device. As a consequence, heat from the light-emitting elements can be released via the closed space and the opening. Therefore, according to this invention, efficient heat release from the light-emitting elements is possible regardless of the use of the frames.

In the above aspect of the invention, the display device can be configured to include a first frame made of a metal that supports the light guide plate on the side opposite to the light exiting surface, and a second frame made of a resin that holds the display panel and has an end plate that covers the light source support member on the side of the light exiting surface, wherein the frame is at least one of the first frame and the second frame, and the opening portion is formed on at least one of the first frame and the second frame. In this invention, the second frame made of a resin is used for the purpose of improving the efficiency of assembling and the positional accuracy between the components. In addition to that, the opening portion is provided on at least one of the frames (the first frame and the second frame). As a consequence, heat from the light-emitting elements can be released via the closed space and the opening. Therefore, according to this invention, efficient heat release from the light-emitting elements is possible regardless of the use of the second frames made of a resin.

In the above aspect of the invention, it is preferable that the frame is the second frame, the first frame has a side plate that overlaps a side plate of the second frame, and a first opening portion is formed on the first frame and a second opening portion is formed on the second frame such that the first opening portion penetrates the side plate of the first frame at a position that overlaps the second opening portion of the second frame. With this configuration, it is possible to release heat from the light-emitting elements via the closed space, the second opening portion of the second frame (opening portion on the frame), and the first opening portion of the first frame.

In the above aspect of the invention, it is preferable that the display device further includes a third frame having an end plate that overlaps the outer side of the end plate of the second frame and a side plate that overlaps the outer side of the side plate of the second frame, wherein a third opening portion is formed on the third frame such that the third opening portion penetrates the side plate of the third frame at a position that overlaps the second opening portion of the second frame. With this configuration, it is possible to release heat from the light-emitting elements via the closed space, the second opening portion of the second frame (opening portion on the frame), the first opening portion of the first frame and the third opening portion of the third frame.

In the above aspect of the invention, the display device can be configured to include a first frame made of a metal that supports the light guide plate on the side opposite to the light exiting surface, and a third frame that covers the display panel on the side of the light exiting surface and is positioned such that the light source support member is disposed between the third frame and the first frame, wherein the frame is at least one of the first frame and the third frame, and the opening portion is formed on at least one of the first frame and the third frame. In this invention, the frames (the first frame and the third frame) are used for the purpose of improving the efficiency of assembling and the positional accuracy between the components. In addition to that, the opening portion is provided on at least one of the frames (the first frame and the third frame). As a consequence, heat from the light-emitting elements can be released via the closed space and the opening.

In the above aspect of the invention, the opening portion can be formed on the side plate of the frame that intersects the extended line of the closed space. This configuration facilitates the air flow from and into the closed space, therefore it is possible to effectively release heat from the light-emitting elements via the closed space and the opening.

In the above aspect of the invention, the opening portion can be formed on the side plate of the frame which constitutes the closed space.

In the above aspect of the invention, the opening portion is preferably formed at a plurality of positions that are spaced apart in the extending direction of the closed space. This configuration facilitates the air flow from and into the closed space, therefore it is possible to effectively release heat from the light-emitting elements via the closed space and the opening.

In the above aspect of the invention, the opening area of the opening portion is preferably greater than the opening area of the closed space. With this configuration, it is possible to effectively release heat from the light-emitting elements via the closed space and the opening.

In the above aspect of the invention, the opening preferably has a predetermined width in the extending direction of the side plate of the frame. With this configuration, it is possible to effectively release heat from the light-emitting elements via the closed space and the opening, since the opening area of the opening is large compared with the slit-shaped gap.

In the above aspect of the invention, each of two opposed side end faces of the light guide plate can serve as the light incident portion, and the closed space and the opening can be formed at each of the two opposed side end faces.

In this case, the opening formed at the closed space on one of the two opposed side end faces can be disposed on the side plate of the frame which constitutes the closed space, and the opening formed at the closed space on the other of the two opposed side end faces can be disposed on the side plate of the frame that intersects the extended line of the closed space. With this configuration, the position and the opening direction of the second opening portion of the second frame can be optimally formed according to the use of the display device.

In the above aspect of the invention, one side of the light source substrate may be configured to oppose the light incident portion. Further, one side of the light source substrate may be configured to intersect the light incident portion.

According to another aspect of the invention, the display device can be used in various electronic apparatuses such as a television set.

According to another aspect of the invention, the illumination device includes a light guide plate, a plurality of light-emitting elements that have a light-emitting surface oriented to a side end face of the light guide plate which serves as a light incident portion and are arranged along the light incident portion, a light source substrate that extends along the light incident portion and has the plurality of light-emitting elements mounted on one side thereof, a light source support member made of a metal that has a substrate holding surface which is in surface contact with the other side of the light source substrate and extends along the light incident portion, a frame that is disposed on the outer side of the light source support member and the light guide plate and has a side plate such that a closed space is formed along the light source support member between the frame and the light source support member, and an opening through which the closed space communicates with an outside of the illumination device.

Accordingly, in the illumination device, a plurality of light-emitting elements are arranged along the light incident portion of the light guide plate, and a plurality of light-emitting elements are mounted on one side of the light source substrates that extends along the light incident portion. In addition, the light source support member made of a metal is further disposed on the other side of the light source substrate, thereby allowing heat from the light-emitting elements to be released via the light source substrate and the light source support member. Further, in this invention, the frames having side plates are used for the purpose of improving the efficiency of assembling and the positional accuracy between the components. In addition to that, the illumination device has the opening through which the closed space communicates to the outside of the illumination device. As a consequence, heat from the light-emitting elements can be released via the closed space and the opening. Therefore, according to this invention, efficient heat release from the light-emitting elements is possible regardless of the use of the frames.

BRIEF DESCRIPTION OF THE DRAWINGS

The invention will be described with reference to the accompanying drawings, wherein like numbers reference like elements.

FIG. 3 is an exploded perspective view which shows further details of the display device according to the embodiment 1 of the invention.

FIGS. 4A and 4B are essential sectional views of the display device according to the embodiment 1 of the invention.

FIG. 8 is an exploded perspective view which shows further details of the display device according to the embodiment 2 of the invention.

FIG. 10 is an explanatory view which shows a penetrating section formed in an illumination device of a display device according to an embodiment 3 of the invention.

FIG. 11 is an explanatory view which shows a penetrating section formed in an illumination device of a display device according to an embodiment 4 of the invention.

DESCRIPTION OF EXEMPLARY EMBODIMENTS

Figure 1A:
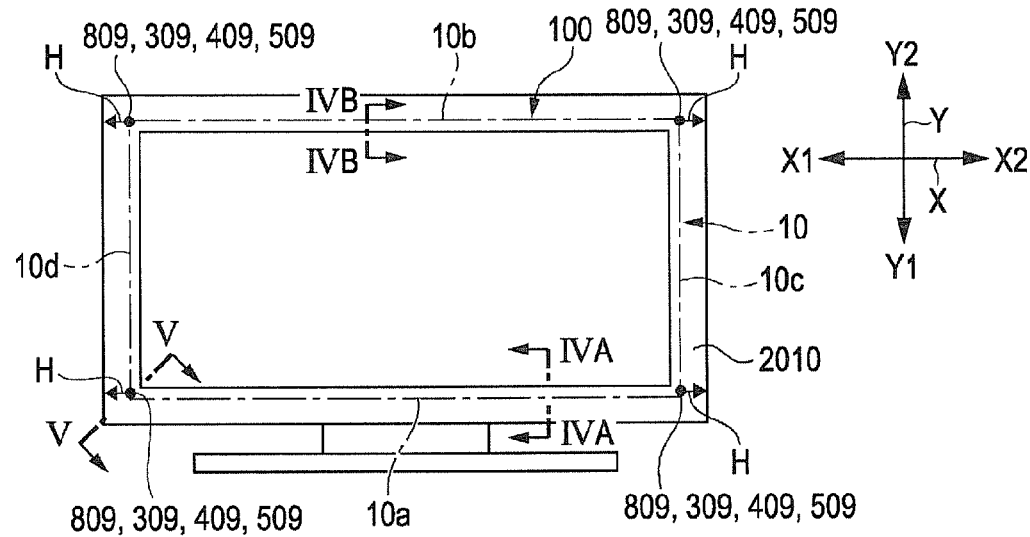
FIGS. 1A and 1B are explanatory views of a liquid crystal television set (electronic apparatus) having a display device according to an embodiment 1 of the invention.

With reference to the drawings, embodiments of the invention applied to a display device for a liquid crystal television set will be described below. Throughout the drawings, layers and components are not shown to the same scale so that each of the layers and components are illustrated in recognizable size in the drawings. In the following description, one of the mutually intersecting directions in a plane of a light guide plate or a liquid crystal panel (the direction in which a long side of the light guide plate or the liquid crystal panel in the drawing exists) is defined as an X axis direction, while the other of the mutually intersecting directions (the direction in which a short side of the light guide plate or the liquid crystal panel exists in the drawing) is defined as a Y axis direction. Further, a direction intersecting the X axis direction and the Y axis direction (the direction in which the light guide plate and the liquid crystal panel are stacked) is defined as a Z axis direction. Throughout the drawings, one side of the X axis direction is defined as X1, while the other side is defined as X2; one side of the Y axis direction (the side on which a hanging over portion of the liquid crystal panel is disposed) is defined as Y1, while the other side which is opposite to the Y1 is defined as Y2; and one side of the Z axis direction (the side to which the back side of the light guide plate faces) is defined as Z1 (lower side), while the other side which is opposite to the Z1 (the side from which illuminating light or display light exits) is defined as Z2 (upper side).

Embodiment 1

Overall Configuration

Figure 1B:
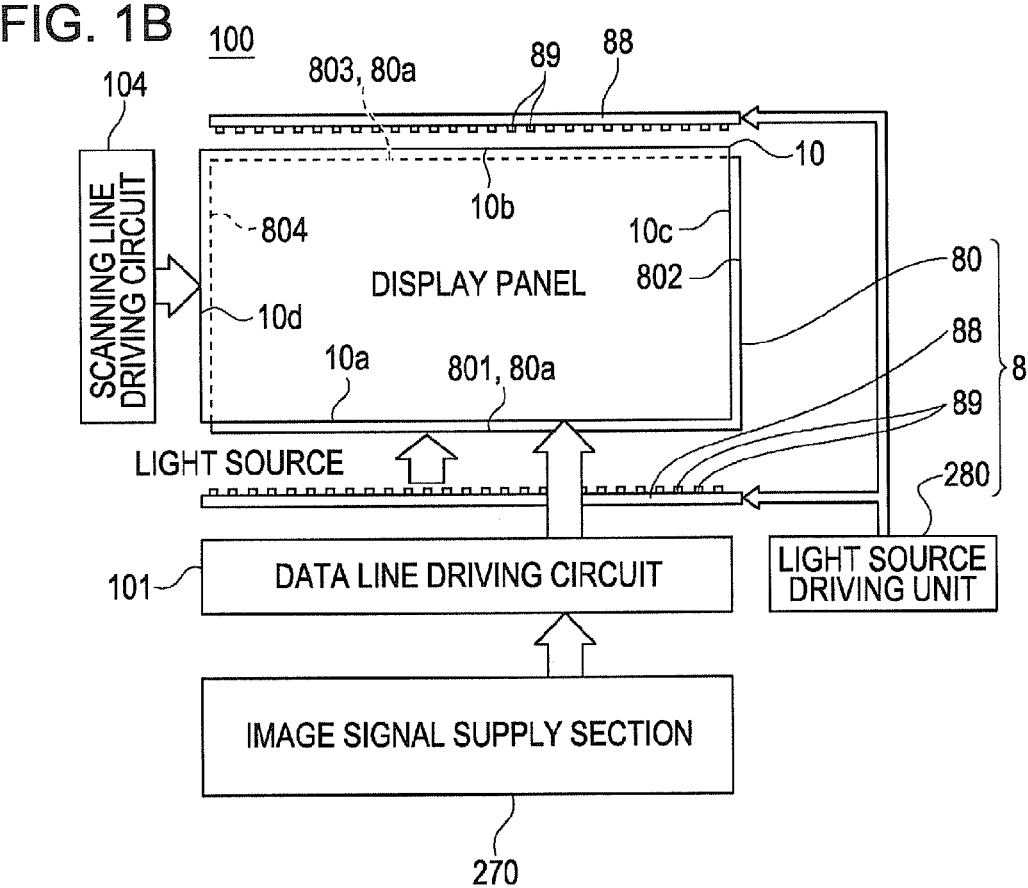

FIGS. 1A and 1B are explanatory views of a liquid crystal television set (electronic apparatus) having a display device according to an embodiment 1 of the invention. FIG. 1A is an explanatory view which schematically shows the appearance of the liquid crystal television set, and FIG. 1B is a block diagram which shows electric configuration of the display device.

An electronic apparatus 2000 shown in FIG. 1A is a liquid crystal television set and includes a display device 100 and a frame 2010 for the television set. As shown in FIG. 1B, the display device 100 includes a display panel 10 (liquid crystal panel), which will be described later in detail with reference to the drawings such as FIGS. 2A and 2B, an image signal supply section 270 that supplies image signals to the display panel 10 from the outside via a flexible wiring board and an illumination device 8 that is disposed on the backside of the display panel 10 and supplies illumination light. The display device 100 further includes a scanning line driving circuit 104 that drives scanning lines which extend in the X axis direction of the display panel 10 and a data line driving circuit 101 that drives data lines which extend in the Y axis direction of the display panel 10. The scanning line driving circuit 104 and the data line driving circuit 101 can be configured such that both are incorporated in the display panel 10. Alternatively, one of the scanning line driving circuit 104 and the data line driving circuit 101 may be incorporated in the display panel 10, while the other may be incorporated in a driver IC which is COG-mounted on the display panel 10 or incorporated in a driver IC which is mounted on a circuit board which is electrically connected to the display panel 10. Alternatively, the scanning line driving circuit 104 and the data line driving circuit 101 can be configured such that both are incorporated in a driver IC which is separate from the display panel 10.

In this embodiment, the illumination device 8 includes a light guide plate 80 that is disposed on the display panel 10, a plurality of light-emitting elements 89 that are arranged along the side end face of the light guide plate 80 which serve as light incident portion 80a (a plurality of light-emitting elements 89 having a light-emitting surface or a light exiting surface that is oriented to oppose the side end face of the light incident portion), light source substrates 88 on which a plurality of light-emitting elements 89 are mounted, and a light source driving unit 280 that drives the light-emitting elements 89. All the light-emitting elements 89 are positioned such that the light-emitting surface opposes the side end face of the light guide plate 80 which serves as the light incident portion 80a. The display panel 10 is formed in a rectangular shape and has four sides 10a, 10b, 10c, 10d. Of those sides 10a, 10b, 10c, 10d, the side 10a is a long side which is located on one side Y1 of the Y axis direction, the side 10b is a long side which is located on the other side Y2 of the Y axis direction, the side 10d is a short side which is located on one side X1 of the X axis direction, and the side 10c is a short side which is located on the other side X2 of the X axis direction. The light guide plate 80 has four side end faces 801, 802, 803, 804 so as to correspond to those sides. Of the side end faces 801, 802, 803, 804, the side end face 801 is located at the long side on one side Y1 of the Y axis direction, the side end face 803 is located at the long side on the other side Y2 of the Y axis direction, the side end face 804 is located at the short side on one side X1 of the X axis direction, and the side end face 802 is located at the short side on the other side X2 of the X axis direction.

Specific Configuration of the Display Device 100

Figure 2A:
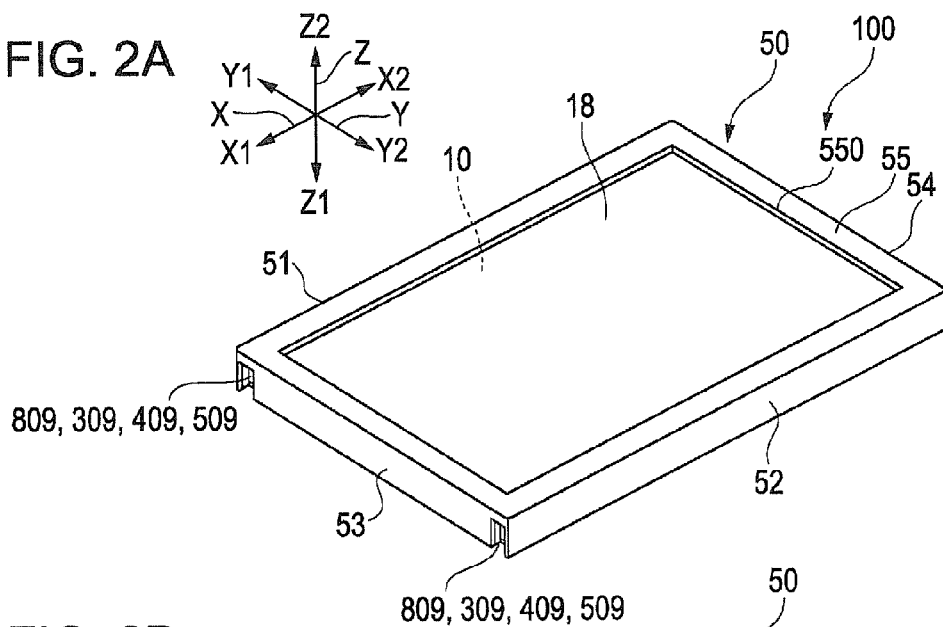
FIGS. 2A and 2B are explanatory views which show an overall configuration of the display device according to the embodiment 1 of the invention.
Figure 2B:
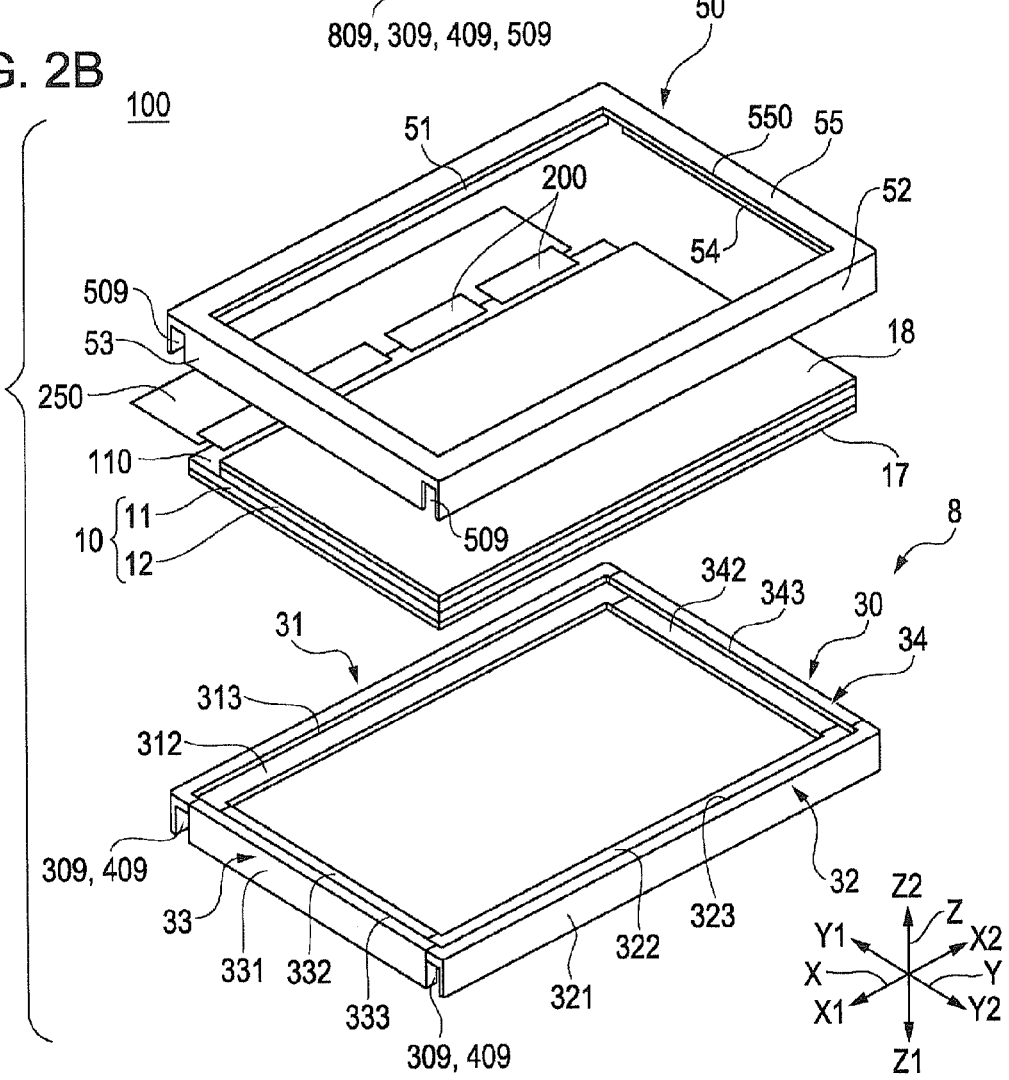
Figure 5:
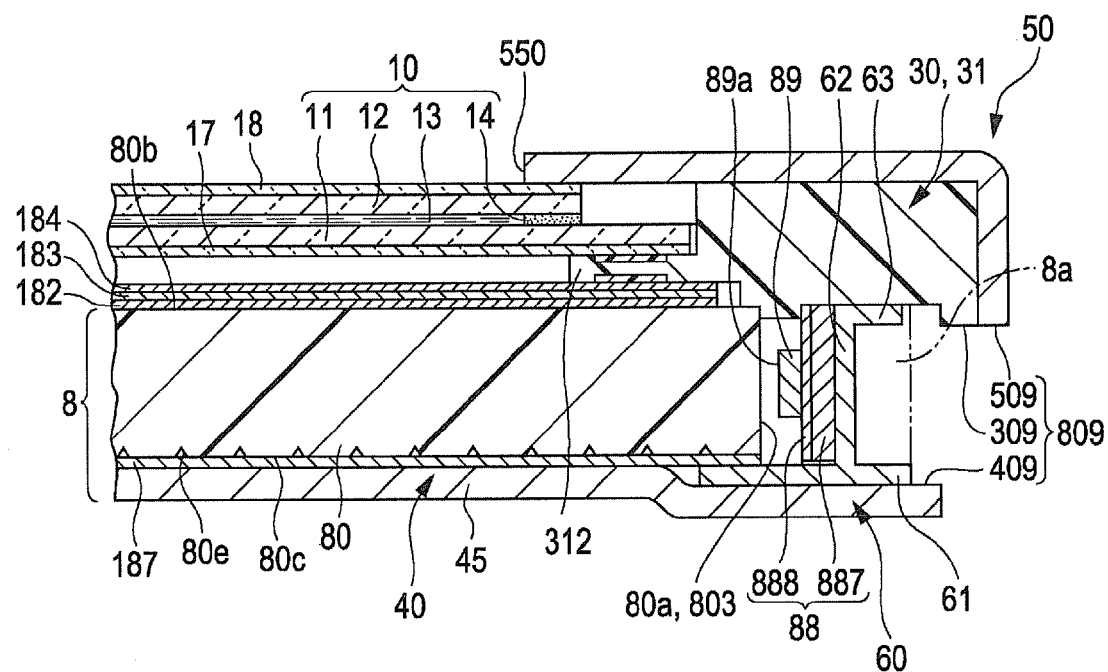
FIG. 5 is an essential sectional view of the display device according to the embodiment 1 of the invention.

FIGS. 2A and 2B are explanatory views which show an overall configuration of the display device 100 according to the embodiment 1 of the invention. FIG. 2A is a perspective view of the display device 100, and FIG. 2B is an exploded perspective view of the display device 100. FIG. 3 is an exploded perspective view which shows further details of the display device 100 according to the embodiment 1 of the invention. FIGS. 4A, 4B and 5 are essential sectional views of the display device 100 according to the embodiment 1 of the invention. FIG. 4A is a sectional view of the display device 100 taken along the line IVA-IVA of FIG. 1A, and FIG. 4B is a sectional view of the display device 100 taken along the line IVB-IVB of FIG. 1A, and FIG. 5 is a sectional view of the display device 100 taken along the line V-V of FIG. 1A.

In FIGS. 2A, 2B, 3, 4A and 4B, the display device 100 of this embodiment substantially includes the illumination device 8 which is so-called backlight unit and the transmissive display panel 10 that is disposed on the upper side of the illumination device 8. In this embodiment, the display panel 10 is formed of a transmissive liquid crystal panel. In the display device 100, the illumination device 8 includes a first frame 40 (lower metal frame) made of a metal that is disposed so as to cover the back side of the light guide plate 80, a second frame 30 (resin frame) that is disposed so as to hold the ends of the display panel 10 at a position above the first frame 40 and surround and hold the illumination device 8, and a third frame 50 (upper metal frame) made of a metal that is disposed on the second frame 30 (on the other side Z2 of the Z axis direction).

The second frame 30 is formed in a rectangular shape so as to hold the ends of the display panel 10 and surround the outer periphery of the display panel 10. In this embodiment, the second frame 30 includes four frame plates 31, 32, 33, 34 that are separated so as to correspond to each of the four sides of the display panel 10. In this embodiment, the second frame 30 is colored in black and serves as a light absorbing member, thereby preventing stray light from being generated in the illumination device 8. The frame plates 31, 32, 33, 34 include side plates 311, 321, 331, 341 that downwardly extend on the outer surface of the frame plates 31, 32, 33, 34, upper plates (end plates) 315, 325, 335, 345 that inwardly bend from the upper end of the side plate 311, 321, 331, 341, and projection plates 312, 322, 332, 342 that inwardly overhang from a position in the height direction of the upper plate 315, 325, 335, 345, respectively. Accordingly, stepped portions 313, 323, 333, 343 are formed between the projection plates 312, 322, 332, 342 and the upper plates 315, 325, 335, 345, respectively, on the inner side of the frame plates 31, 32, 33, 34 such that the display panel 10 is supported by the stepped portions 313, 323, 333, 343 and the projection plates 312, 322, 332, 342. Further, the illumination device 8 such as the light guide plate 80 and the light-emitting elements 89 is disposed under the projection plates 312, 322, 332, 342.

The first frame 40 is formed of a thin metal plate such as a SUS plate which is pressed or otherwise processed. The first frame 40 includes a bottom plate 45 and three side plates 42, 43 and 44 that are erected from the three outer peripheral edges of the bottom plate 45, excluding the outer peripheral edge on one side Y1 of the Y axis direction, and is formed as a rectangular frame that is open on the upper surface. The side plates 321, 331, 341 of the second frame 30 are disposed on the outer side of the side plates 42, 43 and 44 of the first frame 40. Further, the side plate 311 of the second frame 30 covers the other side Y1 of the Y axis direction of the first frame 40.

Similarly to the first frame 40, the third frame 50 is formed of a thin metal plate such as a SUS plate which is pressed or otherwise processed. The third frame 50 includes a rectangular upper plate 55 (end plate) and four side plates 51, 52, 53 and 54 that downwardly bend from the outer peripheral edges of the upper plate 55, and is formed as a rectangular frame that is open on the lower surface. The side plates 51, 52, 53 and 54 are disposed on the outer side of the side plates 311, 321, 331, 341 of the second frame 30. A rectangular window 550 that allows a light emitted from the display panel 10 to exit therethrough is formed on the upper plate 55. The upper plate 55 covers the entire length of the outer peripheral ends of the display panel 10 on the side from which display light exits. Further, the upper plate 55 of the third frame 50 also covers the entire upper surface of the upper plates (end plates) 315, 325, 335, 345 of the second frame 30.

The above-mentioned third frame 50, the second frame 30, and the first frame 40 are connected to each other by means of bolts (not shown) or the like so as to hold the display panel 10 and the illumination device 8 which are housed therein. As shown in FIGS. 4A and 4B, flexible sheets 71, 72 are bonded to the lower and upper surfaces of the projection plates 312, 322, 332, 342 of the second frame 30. Accordingly, when the display device 100 is assembled, the display panel 10 is supported by the projection plates 312, 322, 332, 342 via the flexible sheet 72. Further, optical sheets (a diffusion sheet 182, prism sheets 183, 184 and the like) of the illumination device 8 is pressed via the flexible sheet 71 so as not to be uplifted or displaced when the display device 100 is assembled.

Configuration of the Display Panel 10

As shown in FIGS. 2A to 5, the display panel 10 has a plane rectangular shape and includes an element substrate 11 on which pixel electrodes (not shown) and the like are formed, a counter substrate 12 that is arranged opposite the element substrate 11 with a predetermined gap therebetween, and a sealing material 14 that bonds the counter substrate 12 and the element substrate 11. In the display panel 10, a liquid crystal layer 13 is held in the region enclosed by the sealing material 14. The element substrate 11 and the counter substrate 12 are made of a translucent substrate such as a glass substrate. In the element substrate 11, a plurality of scanning lines (not shown) extend in the X axis direction, while a plurality of data lines extend in the Y axis direction. Further, switching elements (not shown) and the pixel electrodes are arranged at positions corresponding to the intersections between the scanning lines and the data lines (not shown).

In this embodiment, the counter substrate 12 is disposed on the side from which display light exits, and the element substrate 11 is disposed on the side of the illumination device 8. A picture frame layer (not shown) which is formed by a light shielding layer is disposed along the inner edges of the sealing material 14 on the side of the counter substrate 12 which opposes the element substrate 11. The display panel 10 is configured as twisted nematic (TN) type, electrically controlled birefringence (ECB) type or vertical aligned nematic (VAN) type liquid crystal panel such that the pixel electrodes are formed on the element substrate 11 and common electrodes (not shown) are formed on the counter substrate 12. Further, when the display panel 10 is configured as in plane switching (IPS) type or fringe field switching (FFS) type liquid crystal panel, common electrodes are formed on the element substrate 11. Alternatively, the element substrate 11 may be formed on the side from which display light exits with respect to the counter substrate 12. An upper polarizing plate 18 is disposed on the upper side of the display panel 10, and a lower polarizing plate 17 is disposed between the underside of the display panel 10 and the illumination device 8.

In this embodiment, the element substrate 11 is larger than the counter substrate 12. Accordingly, the element substrate 11 has an overhang portion 110 that overhangs from the end of the counter substrate 12 on one side Y1 of the Y axis direction such that a plurality of flexible wiring boards 200 are connected to the upper surface of the overhang portion 110. The flexible wiring boards 200 are connected to a circuit board 250 formed of a rigid substrate, and a driver IC (not shown) that constitutes the image signal supply section 270, which is described with reference to FIGS. 1A and 1B, or a light source driver IC (not shown) that constitutes the light source driving unit 280 are mounted on the circuit board 250.

Configuration of the Illumination Device 8

Figure 6:
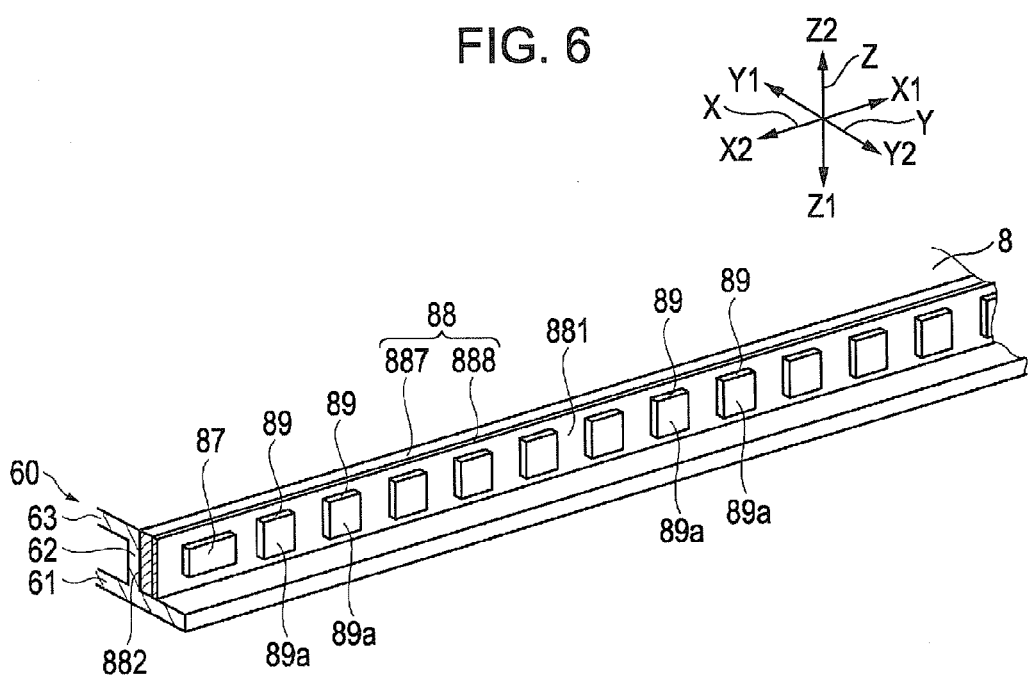
FIG. 6 is an explanatory view which shows light-emitting elements and a light source substrate which are used for an illumination device of the display device according to the embodiment 1 of the invention.

FIG. 6 is an explanatory view which shows the light-emitting elements 89, the light source substrate 88 and the like which are used for the illumination device 8 of the display device 100 according to the embodiment 1 of the invention.

As shown in FIGS. 3 to 6, the illumination device 8 includes the light guide plate 80 that is disposed on the underside of the display panel 10, and a plurality of light-emitting elements 89 that have a light-emitting surface 89a oriented to the light incident portion 80a of the light guide plate 80 and are arranged from one end of the light incident portion 80a (one end X1 of the X axis direction) to the other end of the light incident portion 80a (the other end X2 of the X axis direction). In this embodiment, a plurality of light-emitting elements 89 are mounted on one side 881 of the light source substrate 88 that is disposed in the X axis direction along the light incident portion 80a. The light-emitting elements 89 are light-emitting diodes (LED) that emit a white light and are configured to emit a light source light as a diverging light.

In the illumination device 8 of this embodiment, of the side end faces 801, 802, 803, 804 of the light guide plate 80, two side end faces 801, 803 that oppose each other in the Y axis direction are used as the light incident portions 80a. Accordingly, a plurality of light-emitting elements 89 have a light-emitting surfaces 89a oriented to each of the two light incident portions 80a (the side end faces 801, 803) of the light guide plate 80 and are arranged from one end to the other end of each of the two light incident portions 80a (the side end faces 801, 803). Further, the light source substrates 88 are disposed along each of the two light incident portions 80a (the side end faces 801, 803), and a plurality of light-emitting elements 89 are mounted on one side 881 of each of the two light source substrates 88. A connector 87 (see FIGS. 3 and 6) is mounted on one end on one side 881 of the light source substrate 88, and the connector 87 is used to supply driving current to the light-emitting elements 89 via the light source substrate 88.

As shown in FIGS. 4A and 4B, in this embodiment, the light guide plate 80 is a translucent resin plate which is made of, for example, acrylic resin or polycarbonate resin, and a reflection sheet 187 is disposed between the underside 80c of the light guide plate 80 and the bottom plate 45 of the first frame 40. Further, the optical sheets such as the diffusion sheet 182 and the prism sheets 183, 184 are stacked between the upper side of the light guide plate 80 (a light exiting surface 80b) and the display panel 10. In this embodiment, two prism sheets 183, 184 are arranged such that the respective ridge lines orthogonally intersect with each other.

As a result, an illumination light emitted from the light exiting surface 80b of the light guide plate 80 is diffused to all directions by the diffusion sheet 182, and then the directivity is imparted by two prism sheets 183, 184 so as to have the peak in the front direction of the display panel 10. On the side of the light guide plate 80 on which the reflection sheet 187 is placed, fine recessed depressions or a scattering pattern made of a printed layer of scattering members are formed and, in this embodiment, the density of the scattering pattern increases as the distance from the light-emitting elements 89 increases. Consequently, the intensity distribution of the illumination light emitted from the light guide plate 80 is homogenized regardless of the distance from the light-emitting elements 89. In this embodiment, a number of fine recesses 80e are formed as the scattering pattern on the underside 80c of the light guide plate 80.

The bottom plate 45 of the first frame 40 is partially bent toward the light guide plate 80 so as to form stepped portions. The stepped portions are formed in the areas where the bottom plate 45 overlaps the side end faces 801, 803 of the light guide plate 80 which serve as the light incident portions 80a, thereby forming a gap between the underside 80c of the light guide plate 80 and the first frame 40. In this configuration, the reflection sheet 187 and a lower plate 61 of a light source support member 60 can be held in the narrow gap between the underside 80c of the light guide plate 80 and the bottom plate 45. Moreover, since the bottom plate 45 of the first frame 40 is partially bent toward the light guide plate 80, a recess is formed on the back side of the first frame 40 such that the flexible wiring board 200 is folded and extends on the underside (back side) of the bottom plate 45 of the first frame 40 and the circuit board 250 is housed in the depth of the recess. As a consequence, it is possible to make the illumination device 8 thinner.

In this embodiment, the light source substrate 88 is configured such that one side 881 thereof on which the light-emitting elements 89 are mounted opposes the light incident portion 80a of the light guide plate 80. Further, the light source substrates 88 includes a metal plate 887 formed in a plate shape that extends along the light incident portion 80a, and wiring patterns, lands and an insulating layer are disposed on the side of one side 881 of the metal plate 887. This configuration can be achieved, for example, by stacking a resin base, wiring patterns, and an insulation protective layer in this order on a flexible wiring board 888, and bonding the flexible wiring board 888 on the side of one side 881 of the metal plate 887. As a result, the metal plate 887 is electrically isolated from the wiring patterns and the lands on which the chips of the light-emitting elements 89 are mounted. In this embodiment, the metal plate 887 is made of an aluminum plate so as to enhance the mechanical strength of the light source substrate 88 and serve as a heatsink that dissipates heat from the light-emitting elements 89.

The light source support member 60 that supports the light source substrate 88 is mounted on the other side 882 of each light source substrate 88 and is held between the first frame 40 and the second frame 30. In this embodiment, the light source support member 60 is a rod shaped metallic component that extends along the other side 882 of the light source substrate 88 and a substrate holding surface 620 of a support plate 62 is secured in surface contact with the entire surface of the other side 882 of the light source substrate 88. The light source support member 60 includes the lower plate 61 that overlies the bottom plate 45 of the first frame 40 and the support plate 62 that forms a wall extending upward from a position in the width direction of the lower plate 61. Further, the light source support member 60 includes an upper plate 63 on the upper end of the support plate 62 (the end opposite to the lower plate 61) that bends from the support plate 62 in the direction opposite to the light guide plate 80. The upper plate 63 is secured to the upper plate 55 of the third frame 50 and at least one of the upper plates 315, 325 of the second frame 30 by means of screws or the like.

In this configuration of the light source support member 60, the side of the support plate 62 which faces the light guide plate 80 is formed as the substrate holding surface 620 that support the light source substrate 88. The light source substrate 88 is secured on the substrate holding surface 620 by means of screws or the like (not shown).

Configuration for Heat Dissipation from the Light-Emitting Elements 89

In the illumination device 8 having the above-mentioned configuration, as the temperature of the light-emitting elements 89 increases, the light-emitting elements 89 have problems such as a decrease of light-emitting efficiency, ununiform brightness, and short product life. In this embodiment, the light source support member 60 made of a metal is provided so as to be in surface contact with the other side 882 (back side) of the light source substrates 88 on which the light-emitting elements 89 are mounted so that heat is dissipated to the first frame 40 via the light source support member 60.

Further, in this embodiment, the second frame 30 made of a resin is used for the purpose of improving the efficiency of assembling and the positional accuracy between the components. The second frame 30 has the upper plates (end plates) 315, 325, 335, 345 that cover the light exiting surface side of the light source support member 60 and the side plates 311, 321, 331, 341 that surround the outer side of the light source support member 60 and the light guide plate 80, and has a low thermal conductance.

In this embodiment, as shown in FIGS. 4A and 4B, a closed space 8a is formed between the second frame 30 and the light source support member 60 so as to extend in the extending direction of the light source support member 60. In this embodiment, the first frame 40 does not have a side plate on one side Y1 of the Y axis direction. Accordingly, as shown in FIG. 4A, the closed space 8a formed on one side Y1 of the Y axis direction is closed by the lower plate 61, the support plate 62 and the upper plate 63 of the light source support member 60, and the side plate 311 of the second frame 30 (and a part of the upper plate 315). On the other hand, the first frame 40 has a side plate 42 on the other side Y2 of the Y axis direction. Accordingly, as shown in FIG. 4B, the closed space 8a formed on the other side Y2 side of the Y axis direction is closed by the lower plate 61, the support plate 62 and the upper plate 63 of the light source support member 60, the side plate 42 of the first frame 40 (and a part of the upper plate 325 of the second frame 30). Moreover, as seen from FIGS. 2A, 2B and 3, in the closed spaces 8a formed on one side Y1 and the other side Y2 of the Y axis direction, the side plates 331, 341 of the second frame 30, side plates 43, 44 of the first frame 40, and the side plates 53, 54 of the third frame 50 are located on both ends of the closed space 8a in the extending direction (extended line) of the closed space 8a.

In order to have the closed space 8a communicate with the outside, in this embodiment as shown in FIGS. 2A, 2B and 3, on both ends of the closed space 8a in the X axis direction, notched opening portions 409 are formed on the side plates 43, 44 of the first frame 40 that intersect the extending direction (extended line) of the closed space 8a so as to penetrate the side plates 43, 44. Further, on both ends of the closed space 8a in the X axis direction, notched opening portions 309 are formed on the side plates 331, 341 of the second frame 30 that intersect the extending direction (extended line) of the closed space 8a so as to penetrate the side plates 331, 341. Further, on both ends of the closed space 8a in the X axis direction, notched opening portions 509 are formed on the side plates 53, 54 of the third frame 50 that intersect the extending direction (extended line) of the closed space 8a so as to penetrate the side plates 53, 54. In addition, the opening portions 409 of the first frame 40 and the opening portions 509 of the third frame 50 overlap the opening portions 309 of the second frame 30. Accordingly, as shown in FIGS. 2A and 2B, when the illumination device 8 is assembled, penetrating sections 809 are formed by the opening portions 409 of the first frame 40, the opening portions 309 of the second frame 30, the opening portions 509 of the third frame 50 in the illumination device 8 as shown in FIG. 5. Each penetrating section 809 communicates with the closed space 8a on each end the closed space 8a in the extending direction (X axis direction) of the closed space 8a, and is open to the extending direction (extended line) of the closed space 8a. In this embodiment, each penetrating section 809 has a predetermined width in the extending direction of the side plate 331, 341 of the second frame 30 and the like, and has a large opening area compared with the slit-shaped gap. Thus, in this embodiment, the opening area of the penetrating section 809 is greater than the cross-sectional area (opening area) of the closed space 8a.

Accordingly, as indicated by the arrow H in FIG. 1A, in the illumination device 8 and the display device 100 according to this embodiment, heat from the light-emitting elements 89 can be released to the outside via the light source support member 60 and the closed space 8a through the penetrating section 809 (opening portions 309, 409, 509). The heat is then released from the frame 2010 for the television set to the outside the electronic apparatus 2000.

Main Effects of this Embodiment

As mentioned above, in the illumination device 8 and the display device 100 according to this embodiment, a plurality of light-emitting elements 89 are arranged along the light incident portion 80a of the light guide plate 80, and a plurality of light-emitting elements 89 are mounted on one side 881 of the light source substrates 88 which extends along the light incident portion 80a. Since the light source support member 60 made of a metal is disposed on the other side 882 of the light source substrates 88, heat from the light-emitting elements 89 can be released via the light source substrates 88, the light source support member 60 and the first frame 40 made of a metal.

Further, in this embodiment, the second frame 30 made of a resin is used which includes the upper plates (end plates) 315, 325, 335, 345 that cover the light exiting surface side of the light source support member 60 and the side plates 311, 321, 331, 341 that surround the outer side of the light source support member 60 and the light guide plate 80. The second frame 30 has a low thermal conductance. However, a closed space 8a is formed between the second frame 30 and the light source support member 60 so as to extend in the extending direction of the light source support member 60. In addition, opening portions 309 that penetrate the side plates 331, 341 of the second frame 30 are formed on the second frame 30 so as to communicate with the closed space 8a. As a result, heat from the light-emitting elements 89 can be released via the closed space 8a and the opening portions 309. Further, the first frame 40 has the side plates 43, 44 that overlap the side plates 331, 341 of the second frame 30, and opening portions 409 are formed on the side plates 43, 44 of the first frame 40 at positions corresponding to the opening portions 309 of the second frame 30. Further, the third frame 50 has the side plates 53, 54 that overlap the side plates 331, 341 of the second frame 30, and opening portions 509 are formed on the side plates 53, 54 of the third frame 50 at positions corresponding to the opening portions 309 of the second frame 30. Accordingly, the penetrating sections 809 that communicate with the closed space 8a are formed on the illumination device 8, which makes it possible to release heat from the light-emitting elements 89 via the closed space 8a and the penetrating section 809. Since this can reduce the heat generated from the light-emitting elements 89, it is possible to suppress decrease of light-emitting efficiency, ununiform brightness, and short product of the light-emitting elements 89.

Further, since the penetrating sections 809 (opening portions 309, 409, 509) which are formed at a plurality of positions spaced apart from each other in the extending direction of the closed space 8a, the penetrating sections 809 can facilitate an air flow from and into the closed space 8a. Particularly, in this embodiment, since the penetrating sections 809 (opening portions 309, 409, 509) which are formed on both ends of the extending direction of the closed space 8a and are open toward the extended line of the closed space 8a, the penetrating sections 809 can facilitate an air flow from and into the closed space 8a. Accordingly, it is possible to release heat from the light-emitting elements 89 to the outside via the closed space 8a and the penetrating section 809 and achieve efficient heat dissipation.

Embodiment 2

Figure 7A:
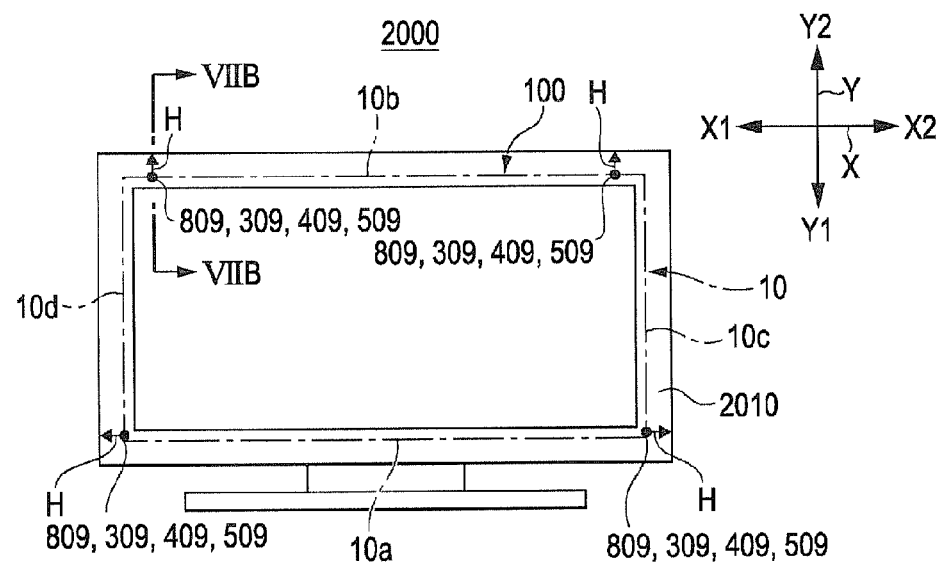
FIGS. 7A and 7B are explanatory views which show an illumination device of a display device according to an embodiment 2 of the invention.
Figure 7B:
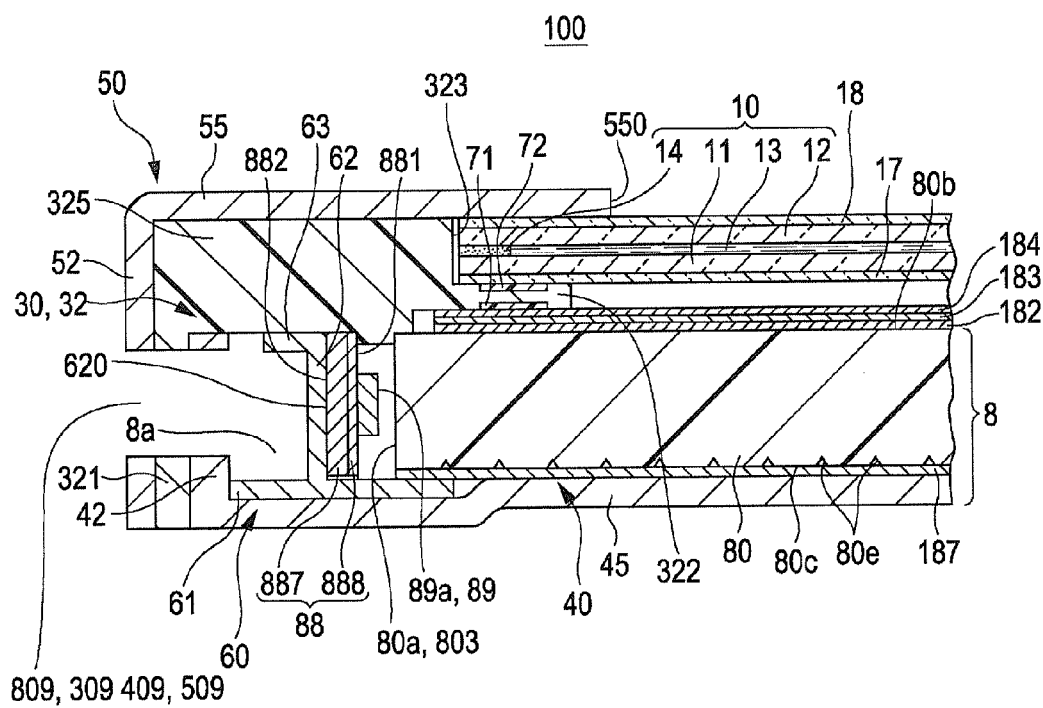

FIGS. 7A and 7B are explanatory views which show an illumination device 8 of a display device 100 according to an embodiment 2 of the invention. FIG. 7A is an explanatory view which shows positioning of penetrating sections 809 in the display device 100, and FIG. 7B is a sectional view around the penetrating section 809 in the display device 100 taken along the line VIIB-VIIB of FIG. 7A. FIG. 8 is an exploded perspective view which shows further details of the display device according to the embodiment 2. The essential configuration of the embodiment 2 is the same as that of the embodiment 1, therefore the same numbers are used for the same elements so as to omit their explanation.

In the embodiment 1, in each closed space 8a formed on each side of the Y axis direction (the side on which a plurality of light-emitting elements 89 are mounted), each opening is formed on each side plate of the frame that intersects the extending direction (extended line) of the closed space 8a so as to penetrate the side plate. In the embodiment 2 as shown in FIGS. 7A and 8, in the closed space 8a formed on the other side Y2 of the Y axis direction (the upper side of the television screen), which is one of the two closed spaces 8a formed on both sides of the Y axis direction, the penetrating sections 809 are formed on both ends of the extending direction of the closed space 8a so as to be open in the upper direction that intersects the extending direction of the closed space 8a. In this configuration, since the opening direction of the penetrating section 809 formed on the other side Y2 of the Y axis direction corresponds to the nature of heat that tends to move upward, it is possible to effectively release heat of the light-emitting elements 89.

Figure 9:
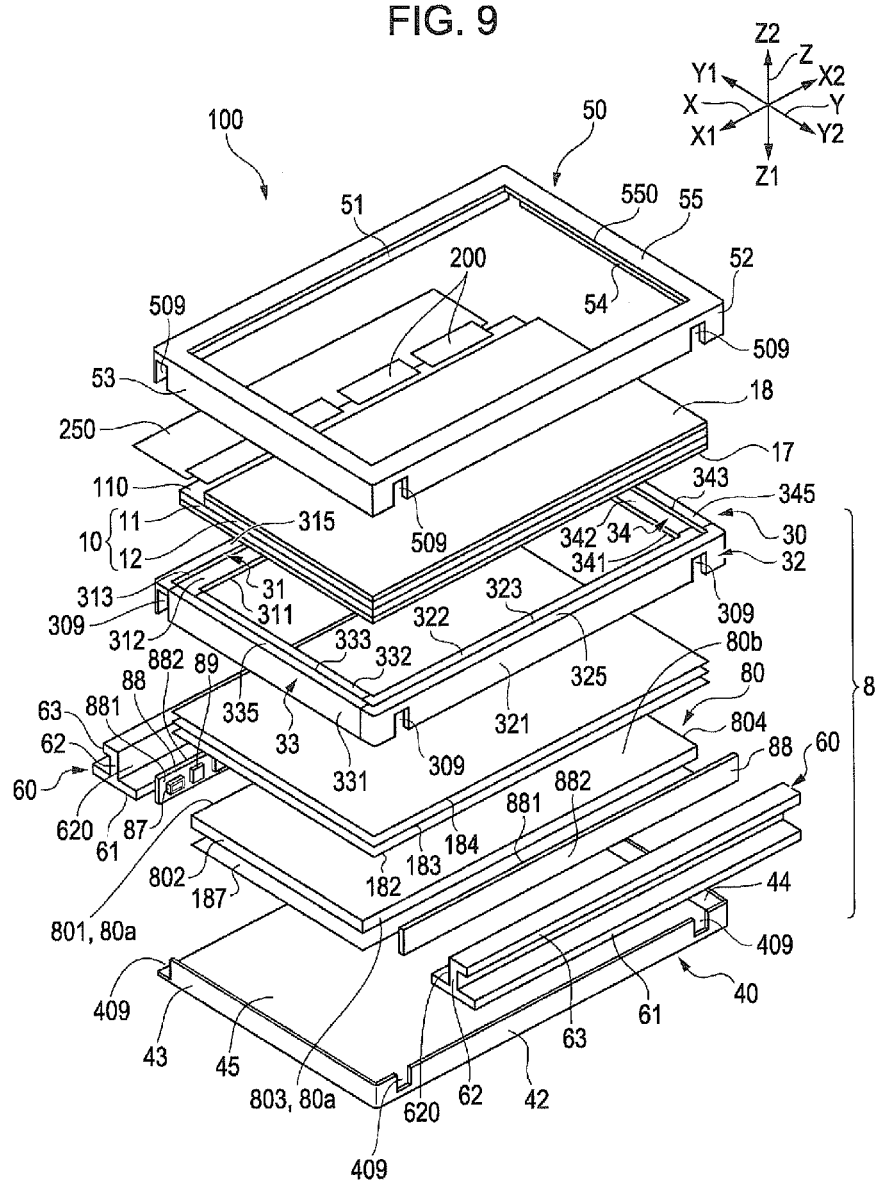
FIG. 9 is an exploded perspective view which shows further details of an alternative example of the display device according to the embodiment 2 of the invention.

As shown in FIG. 7B, in the closed space 8a which is formed on the other side Y2 of the Y axis direction, the configuration in which the penetrating section 809 is open in the upper direction that intersects the extending direction of the closed space 8a can be achieved by providing opening portions 309, 409, 509 on a side plate 42 of a first frame 40, a side plate 321 of a second frame 30 and a side plate 52 of a third frame 50, respectively. In the embodiment 2, the shape of the penetrating section 809 formed on the other side Y2 of the Y axis direction (the upper direction of the television screen) in plane view is rectangular as shown in FIG. 8, although the shape is not limited thereto. FIG. 9 is an exploded perspective view which shows further details of an alternative example of the display device according to the embodiment 2 of the invention. As shown in FIG. 9, the opening portions 309, 409, 509 may be formed by providing notched portions on the side plate 42 of the first frame 40, the side plate 321 of the second frame 30, and the side plate 52 of, the third frame 50. According to this configuration, the openings (penetrating sections) can be easily formed compared with the case where the rectangular through holes are formed on each of the side plates 42, 321, 52.

Embodiment 3

FIG. 10 is an explanatory view which shows penetrating sections 809 formed in an illumination device 8 of a display device 100 according to an embodiment 3 of the invention. The essential configuration of the embodiment 3 is the same as that of the embodiment 1, therefore the same numbers are used for the same elements so as to omit their explanation.

In the embodiment 2, in the closed spaces 8a formed on both sides of the Y axis direction, the penetrating section 809 is formed on each end of the closed spaces 8a, although the opening direction of the penetrating section 809 differs from that of the embodiment 1.

In the embodiment 3 as shown in FIG. 10, in the closed space 8a formed on the other side Y2 of the Y axis direction, which is one of the two closed spaces 8a formed on both sides of the Y axis direction, the penetrating sections 809 are formed at positions between both ends of the closed space 8a in the extending direction of the closed space 8a. As described above with reference to the figures such as FIG. 3, the penetrating sections 809 are formed by providing opening portions on each of side plates 42, 321, 52 of a first frame 40, a second frame 30 and a third frame 50. In this configuration, since the opening direction of the penetrating section 809 formed on the other side Y2 of the Y axis direction (the upper side of the television screen) corresponds to the nature of heat that tends to move upward, it is possible to effectively release heat of light-emitting elements 89. Moreover, in the configuration in which the closed space 8a formed on the other side Y2 (upper side) of the Y axis direction has the penetrating sections 809 that are formed at positions between both ends of the extending direction of the closed space 8a so as to be open in the upper direction, when a frame 2010 for a television set, for example, has vent holes that are provided at positions inside the both ends of the frame in the X axis direction, the openings of the penetrating sections 809 can be positioned at positions that correspond to the positions of the vent holes of the frame 2010 for the television set.

Embodiment 4

FIG. 11 is an explanatory view which shows penetrating sections 809 formed in an illumination device 8 of a display device 100 according to an embodiment 4 of the invention. The essential configuration of the embodiment 4 is the same as that of the embodiment 1, therefore the same numbers are used for the same elements so as to omit their explanation.

As shown in FIG. 11, in the closed spaces 8a formed on both sides of the Y axis direction, the penetrating sections 809 may be formed at positions between both ends of the closed space 8a in the extending direction of the closed space 8a so as to be open in the upper direction that intersects the extending direction of the closed space 8a. In this configuration, when a frame 2010 for a television set, for example, has vent holes that are provided at positions inside the both ends of the frame in the X axis direction, the openings of the penetrating sections 809 can be positioned at positions that correspond to the positions of the vent holes of the frame 2010 for the television set.

Embodiment 5

Figure 12:
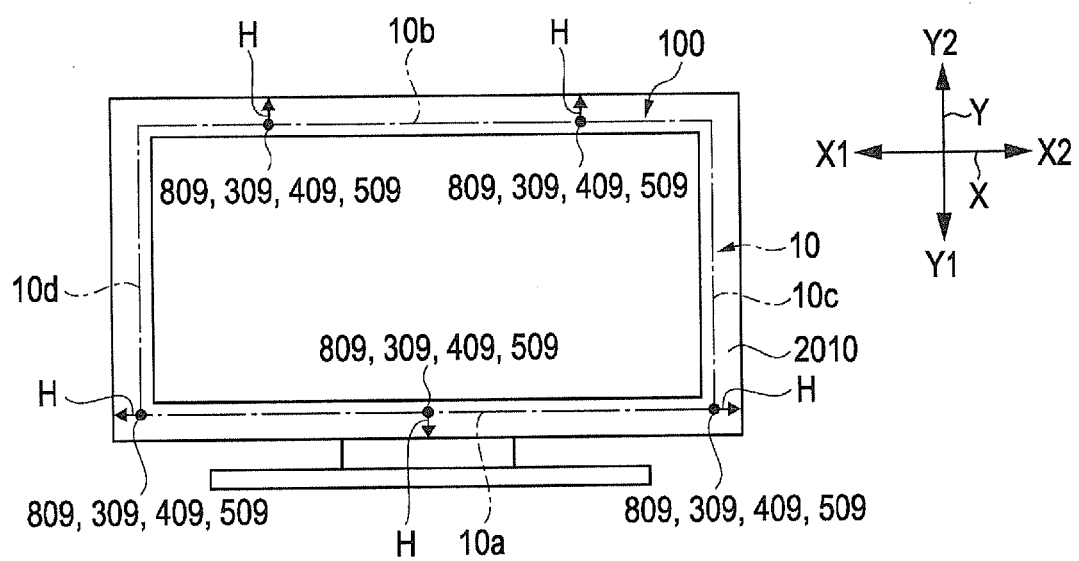
FIG. 12 is an explanatory view which shows a penetrating section formed in an illumination device of a display device according to an embodiment 5 of the invention.

FIG. 12 is an explanatory view which shows a penetrating section formed in an illumination device 8 of a display device 100 according to an embodiment 5 of the invention. The essential configuration of the embodiment 5 is the same as that of the embodiment 1, therefore the same numbers are used for the same elements so as to omit their explanation.

In the embodiment 5, in contrast to the embodiment 3, in a closed space 8a formed on one side Y1 of the Y axis direction, which is one of the two closed spaces 8a formed on both sides of the Y axis direction, penetrating sections 809 are formed on both ends and at the center of the closed space 8a in the extending direction of the closed space 8a. The penetrating section 809 is formed by providing opening portions 309, 409, 509 on each of side plates 43, 44, 311, 331, 341, 51, 53, 54 of a first frame 40, a second frame 30 and a third frame 50 as described above with reference to the figures such as FIG. 3. In this configuration, it is possible to allow the air to flow into the closed space 8a through the penetrating section 809 that is formed at the center of the closed space 8a so as to be open to the lower side (Y1 direction) of a frame 2010 for a television set, and to allow the air warmed by heat of the light-emitting elements 89 to flow out through the penetrating sections 809 formed on the both ends of the closed space 8a. That is, it is possible to effectively release heat of the light-emitting elements 89. The number of the penetrating sections 809 that are open to the lower side (Y1 direction) of the frame 2010 of the television set is not limited to one, and a plurality of (two) penetrating sections 809 may be provided as shown in the embodiment 4. Further, depending on the size of the display device 100 that is used for an electronic apparatus (liquid crystal television set) 2000, a plurality of light source substrates 88 on which a plurality of light-emitting elements 89 are mounted may be positioned along a light incident portion 80a of a light guide plate 80 so as to oppose the light incident portion 80a. In this configuration, the penetrating sections 809 are desirably formed at positions corresponding to positions between the adjacent light source substrates 88. In this case, unevenness of heat dissipation of each light source substrate 88 can be reduced compared with the case where the penetrating sections 809 are positioned regardless of the positions of the light source substrates 88. Further, by increasing the opening area of the penetrating section 809 formed on the both ends of the closed space 8a compared with that of the penetrating section 809 formed on the side 10a, it is possible to facilitate the air flow into the closed space 8a and achieve highly effective heat dissipation.

Embodiment 6

Figure 13A:
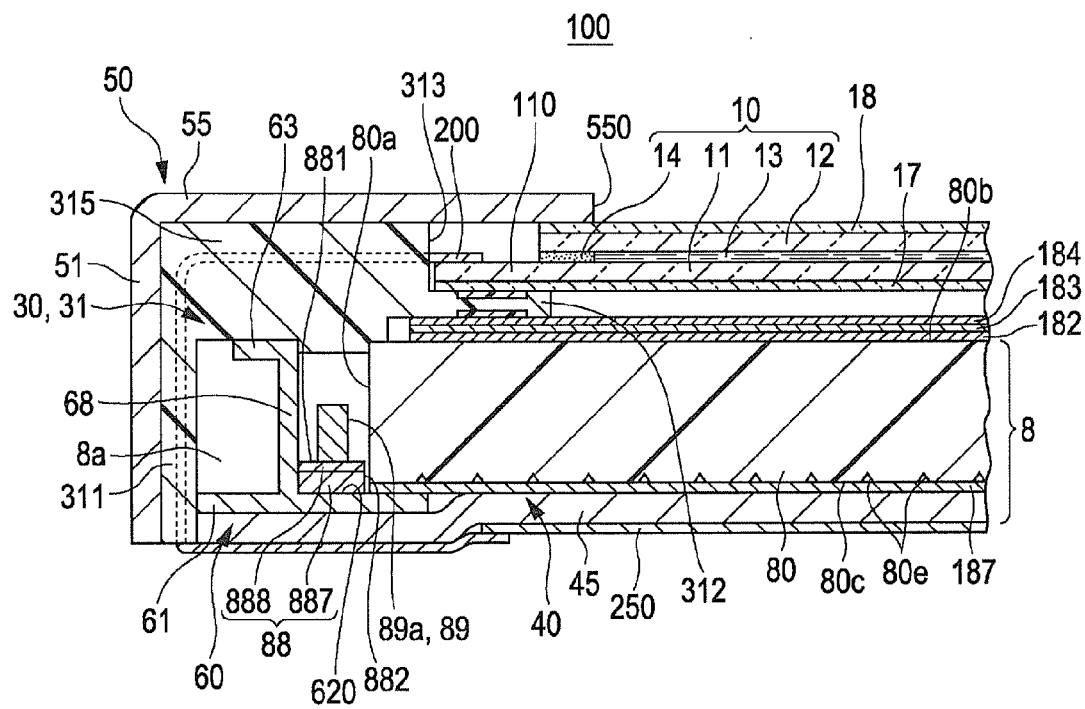
FIGS. 13A and 13B are essential sectional views of a display device according to an embodiment 6 of the invention.
Figure 13B:
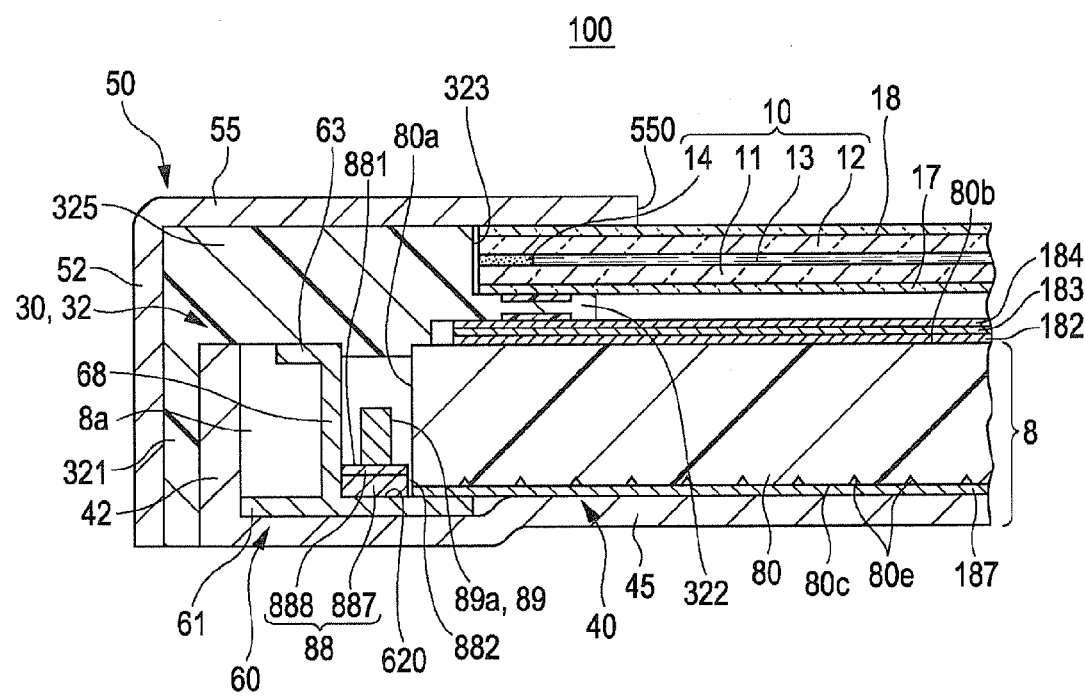

FIGS. 13A and 13B are essential sectional views of a display device 100 according to an embodiment 6 of the invention. FIG. 13A is a sectional view that corresponds to the view taken along the line IVA-IVA which is shown in FIG. 4A, and FIG. 13B is a sectional view that corresponds to the view taken along the line IVB-IVB which is shown in FIG. 4B. The essential configuration of the embodiment 6 is the same as that of the embodiment 1, therefore the same numbers are used for the same elements so as to omit their explanation.

While in the above embodiments 1 to 5, one side 881 of the light source substrate 88 on which the light-emitting elements 89 are mounted is configured to oppose the light incident portion 80a of the light guide plate 80, in the embodiment 6 as shown in FIGS. 13A and 13B, one side 881 of a light source substrate 88 on which light-emitting elements 89 are mounted is oriented to the direction which forms an angle of 90 degrees relative to a light incident portion 80a of a light guide plate 80. The light-emitting elements 89 are mounted on one side 881 of the light source substrate 88 with a light-emitting surface 89a being oriented to the direction parallel to one side 881 of the light source substrate 88. Accordingly, light source light from the light-emitting elements 89 can be incident into the light guide plate 80 through the light incident portion 80a.

Similarly to the embodiments 1 to 5, in the display device 100 and the illumination device 8 having the above-mentioned configuration, the closed space 8a is formed between a second frame 30 and a light source support member 60 so as to extend in the extending direction of the light source support member 60. Further, similarly to the embodiments 1 to 5, since the penetrating sections 809 that communicate with the closed space 8a are also formed in this embodiment (for example, refer to FIGS. 1A to 3), it is possible to effectively release heat of the light-emitting elements 89.

In the embodiment 6, a substrate holding surface 620 of the light source support member 60 is formed on a lower plate 61, and is oriented to the direction which forms an angle of 90 degrees relative to the light incident portion 80a of the light guide plate 80. Further, a vertical plate 68 of the light source support member 60 that extends vertically from the lower plate 61 is disposed so as to oppose the light incident portion 80a of the light guide plate 80. Accordingly, as shown in FIG. 13A, the closed space 8a formed on one side Y1 of the Y axis direction is formed by the lower plate 61, a vertical plate 68, an upper plate 63 of the light source support member 60, and a side plate 311 and an upper plate 315 of a second frame 30. On the other hand, as shown in FIG. 13B, the closed space 8a formed on the other side Y2 of the Y axis direction is formed by the lower plate 61, the vertical plate 68 and the upper plate 63 of the light source support member 60, an upper plate 325 of the second frame 30, and a side plate 42 of a first frame 40. As seen from FIGS. 2A, 2B and 3, in the closed spaces 8a formed on one side Y1 and the other side Y2 of the Y axis direction, side plates 331, 341 of the second frame 30, side plates 43, 44 of the first frame 40, and side plates 53, 54 of a third frame 50 are located on both ends of the closed space 8a in the extending direction of the closed space 8a, and opening portions 309, 409, 509 are formed on those side plates.

Other Embodiment

While in the above-mentioned embodiments, the side plate for the long side of the first frame 40 is provided as the side plate 42 only on the other side Y2 of the Y axis direction, the side plates may be provided on both long sides of the first frame 40 (on one side Y1 and the other side Y2 of the Y axis direction). In this case, the cross section which is shown in FIG. 4A taken along the line IVA-IVA is configured substantially the same as that of FIG. 4B. Alternatively, the side plates may not be provided on both long sides of the first frame 40 (on one side Y1 and the other side Y2 of the Y axis direction). In this case, the cross section which is shown in FIG. 4B taken along the line IVB-IVB is configured substantially the same as that of FIG. 4A.

While in the above-mentioned embodiments, the opening area of the penetrating section 809 (opening portions 309, 409, 509) may be the same as the cross sectional area (the opening area) of the closed space 8a which is shown in the figures such as FIGS. 4A and 4B, the opening area of the penetrating section 809 (opening portions 309, 409, 509) is preferably greater than the cross sectional area (the opening area) of the closed space 8a which is shown in the figures such as FIGS. 4A and 4B in order to achieve highly effective heat dissipation.

While in the above-mentioned embodiments, the penetrating sections 809 are formed on the extended line of the closed space 8a, the penetrating sections 809 may be formed at a position offset from each other as long as being spatially connected to the closed space 8a. For example, a space is provided between the side end face 802 of the light guide plate 80 and the side plate 43 of the first frame 40 and between the side end face 804 of the light guide plate 80 and the side plate 44 of the first frame 40, thereby connecting the penetrating section 809 and the closed space 8a via the space. In this configuration, heat dissipation effect can be retained even if the penetrating section 809 is not located on the extended line of the closed space 8a. In this case, the penetrating section 809 (opening portions 309, 409, 509) can be formed at a position away from the frame corner, thereby enhancing the strength of the frame corner and improving the rigidity of the display device 100.

When the penetrating section 809 (opening) and the closed space 8a are connected via the space, heat dissipation effect can be improved by using the space between the penetrating section 809 and the closed space 8a by increasing the area of the penetrating section 809 (opening) to be greater than the cross sectional area of the closed space 8a.

Moreover, the penetrating section 809 (opening) can be used as an opening through which cables for supplying power to the light-emitting elements 89 pass. In this case, since an opening for cables does not need to be provided separately, both wiring and heat dissipation can be achieved without impairing the strength of the display device 100.

While in the above-mentioned embodiments, the penetrating sections 809 (openings) are provided on the side end faces of the display device 100, the penetrating sections 809 may be formed on the front side (the upper end face of each frame, upper plate, or the other side Z2 of the Z axis direction), or the back side (one side Z1 of the Z axis direction) of the peripheral area of the display device 100. In this case, for example, the openings can be provided on the back side of the display device 100 for heat dissipation. Further, the size of the opening formed on the side end face may be increased so as to be connected to the opening formed on the adjacent end face, thereby forming the larger opening and improving heat dissipation effect.

While in the above-mentioned embodiments, the configuration of the invention includes the first frame 40, the second frame 30 and the third frame 50, two frames of the first frame 40 and the second frame 30 may be used in the configuration. In this case, the closed space 8a may be configured to communicate with the outside by providing opening portions on the side plates of the frame (at least one of the side plate of the first frame 40 and the side plate of the second frame 30) that constitute the closed space 8a.

Alternatively, two frames of the first frame 40 and the third frame 50 may be used in the configuration of the invention. In this case, the closed space 8a may be configured to communicate with the outside by providing opening portions on the side plates of the frame (at least one of the side plate of the first frame 40 and the side plate of the third frame 50) that constitute the closed space 8a.

An Example Applied to Electronic Apparatus

While in the above-mentioned embodiments, the liquid crystal television set is described as an example of the electronic apparatus 2000 in which the display device 100 is used, the display device 100 may be used for other devices than the liquid crystal television set, such as displays for personal computers, digital signages, car navigation systems, display units for electronic apparatuses including personal digital assistances.

The entire disclosure of Japanese Patent Application No.: 2011-152736, filed Jul. 11, 2011, 2011-263435, filed Dec. 1, 2011, and 2011-263436, filed Dec. 1, 2011 are expressly incorporated by reference herein.

What is claimed is:

1. A display device having an illumination device and a display panel that is disposed on a light exiting surface of the illumination device, the illumination device comprising:
   a light guide plate;
   a plurality of first light-emitting elements that each have a first light-emitting surface oriented to face a first side end face of the light guide plate which serves as a first light incident portion, and the plurality of first light-emitting elements are arranged along the first light incident portion;
   a plurality of second light-emitting elements that each have a second light-emitting surface oriented to face a second side end face of the light guide plate which serves as a second light incident portion, and the plurality of second light-emitting elements are arranged along the second light incident portion;
   a first light source substrate having the plurality of first light-emitting elements mounted on one side thereof and extending along the first light incident portion, the first light source substrate being disposed opposite to the first side end face;
   a second light source substrate having the plurality of second light-emitting elements mounted on one side thereof and extending along the second light incident portion, the second light source substrate being disposed opposite the second side end face;
   a first light source support member made of a metal that extends along the first side end face, has a first substrate holding surface which is in surface contact with an other side of the first light source substrate, and the first light source support member includes a first support plate that contacts the first light source substrate, and
   a second light source support member made of a metal that extends along the second side end face, and has a second substrate holding surface which is in surface contact with an other side of the second light source substrate, and the second light source support member includes a second support plate that contacts the second light source substrate;

a first frame made of a metal that is disposed on an outer side of the first light source support member, the second light source support member and the light guide plate, the first frame including:
a first side plate of the first frame such that a first closed space is formed along the first light source support member between the first side plate of the first frame and the first support plate, and
a second side plate of the first frame that is adjacent to the first side plate,
wherein:
the illumination device has an unobstructed opening through which the first closed space communicates with an outside of the illumination device without interruption, the opening being formed by at least one opening portion, the opening being formed on the second side plate of the first frame that intersects an extended line of the first closed space, and
a second closed space is formed between the first light source substrate and the first side end face, and a first cross section area of the first closed space in a plane which intersects the first light source substrate is larger than a second cross section area of the second closed space in the plane.

2. The display device according to claim 1, further comprising:
the first frame that supports the light guide plate on a side opposite to the light exiting surface; and
a third frame that covers the display panel on a side of the light exiting surface and is positioned such that the first light source support member is disposed between the third frame and the first frame,
wherein a third opening portion is formed on the third frame.

3. The display device according to claim 1, wherein, the opening formed at the second closed space on one of the two opposite side end faces of the light guide plate is disposed on the first side plate of the first frame which constitutes the second closed space, and a second opening formed at the second closed space on the other of the two opposite side end faces is disposed on the second side plate of the first frame that intersects an extended line of the second closed space.

4. The display device according to claim 1, wherein the one side of the first light source substrate opposes the first light incident portion.

5. An electronic apparatus comprising the display device according to claim 1.

6. The display device according to claim 1, further comprising:
a second frame made of a resin that holds the display panel and has an end plate that covers the light source support member on a side of the light exiting surface, the second frame including:
a first side plate of the second frame, and
a second side plate of the second frame that is adjacent to the first side plate of the second frame, wherein:
the second side plate of the first frame overlaps the second side plate of the second frame, and a first opening portion is formed on the first frame and a second opening portion is formed on the second frame such that the first opening portion penetrates the second side plate of the first frame at a position that overlaps the second opening portion of the second frame.

7. The display device according to claim 6, further comprising a third frame having an end plate that overlaps an outer side of the end plate of the second frame and a second side plate of the third frame that overlaps an outer side of the second side plate of the second frame,
wherein a third opening portion is formed on the third frame such that the third opening portion penetrates the second side plate of the third frame at a position that overlaps the second opening portion of the second frame.

8. The display device according to claim 6, wherein an opening area of one of the first and second opening portions is greater than an opening area of the first closed space in the plane.

9. The display device according to claim 6, wherein the opening has a predetermined width in an extending direction of one of the second side plate of the first frame and the second side plate of the second frame.

10. The display device according to claim 7, wherein the first, second and third opening portions are formed at a plurality of positions that are spaced apart in an extending direction of the first closed space.

11. An illumination device comprising:
a light guide plate;
a plurality of first light-emitting elements that each have a first light-emitting surface oriented to face a first side end face of the light guide plate which serves as a first light incident portion, and the plurality of first light-emitting elements are arranged along the first light incident portion;
a plurality of second light-emitting elements each of which have a second light-emitting surface oriented to face a second side end face of the light guide plate which serves as a second light incident portion, and the plurality of second light-emitting elements are arranged along the second light incident portion;
a first light source substrate having the plurality of first light-emitting elements mounted on one side thereof and extending along the first light incident portion, the first light source substrate being disposed opposite to the first side end face;
a second light source substrate extending along the second light incident portion and having the plurality of second light-emitting elements mounted on one side thereof, the second light source substrate being disposed opposite the second side end face;
a first light source support member made of a metal that has a first substrate holding surface which is in surface contact with an other side of the first light source substrate, and the first light source support member includes a first support plate that contacts the first light source substrate, and
a second light source support member made of a metal that has a second substrate holding surface which is in surface contact with an other side of the second light source substrate, and the second light source support member includes a second support plate that contacts the second light source substrate,
a first frame made of metal that is disposed on an outer side of the first light source support member, the second light source support member and the light guide plate, the first frame including:
a first side plate of the first frame such that a first closed space is formed along the first light source support member between the first side plate of the first frame and the first support plate, and
a second side plate of the first frame that is adjacent to the first side plate;
an unobstructed opening through which the first closed space communicates with an outside of the illumination device without interruption, the opening being formed on the second side plate of the first frame that intersects an extended line of the first closed space, and a second closed space is formed between the first light source substrate and the first side end face, and a first cross section area of the first closed space in a plane which intersects the first light source substrate is larger than a second cross section area of the second closed space in the plane.

12. A display device having an illumination device and a display panel that is disposed above a light exiting surface of the illumination device, the illumination device comprising:

a light guide plate;

a plurality of light-emitting elements that each have a light-emitting surface oriented to a side end face of the light guide plate which serves as a light incident portion, and the plurality of light-emitting elements are arranged along the light incident portion;

a light source substrate that has the plurality of light-emitting elements mounted on one side thereof and extends along the light incident a light source support member made of a metal that extends along the side end face, has a substrate holding surface which is in surface contact with an other side of the light source substrate, and the light source support member includes a support plate that contacts the light source substrate, and a first frame that is disposed on an outer side of the light source support member and the light guide plate, and has a first side plate such that a first closed space is formed along the light source support member between the first side plate of the first frame and the support plate, wherein:

the illumination device has an unobstructed opening through which the first closed space communicates with an outside of the illumination device without interruption, the opening being formed by at least one opening portion, the opening being formed on a second side plate, and a second closed space is formed between the light source substrate and the side end face, and a first cross section area of the first closed space in a plane which intersects the light source substrate is larger than a second cross section area of the second closed space in the plane.

13. An illumination device comprising:

a light guide plate;

a plurality of light-emitting elements each having a light-emitting surface oriented to a first side end face of the light guide plate which serves as a light incident portion, and the plurality of light-emitting elements being arranged along the light incident portion;

a light source substrate extending along the light incident portion and having the plurality of light-emitting elements mounted on one side;

a light source support member made of a metal having a substrate holding surface which is in surface contact with an other side of the light source substrate, a first frame being disposed on an outer side of the light source support member and the light guide plate and having a first side plate such that a first closed space is formed along the light source support member between the first side plate of the first frame and the support plate, and an unobstructed opening through which the first closed space communicates with an outside of the illumination device without interruption, the opening being formed on a second side plate, wherein:

a second closed space is formed between the light source substrate and the side end face, and a first cross section area of the first closed space in a plane which intersects the light source substrate is larger than a second cross section area of the second closed space in the plane.

14. A display device having an illumination device and a display panel that is disposed above a light exiting surface of the illumination device, the illumination device comprising:

a light guide plate;

a plurality of light-emitting elements that each have a light-emitting surface oriented to a side end face of the light guide plate which serves as a light incident portion, and the plurality of light-emitting elements are arranged along the light incident portion;

a light source substrate that has the plurality of light-emitting elements mounted on one side thereof and extending along the light incident a light source support member made of a metal that extends along the side end face, and has a substrate holding surface which is in surface contact with an other side of the light source substrate, a first frame that is disposed on an outer side of the light source support member and the light guide plate and has a first side plate such that a closed space is formed along the light source support member between the first side plate of the first frame and the support plate, wherein:

the illumination device has an unobstructed opening through which the closed space communicates with an outside of the illumination device without interruption, the opening being formed by at least one opening portion, the opening being formed on a second side plate of the first frame that intersects an extended line of the closed space, and a first distance between the support plate of the light source support member and the first side plate of the first frame which faces the support plate of the light source support member in a direction that intersects the light source substrate is larger than a second distance between the one side of the light source substrate and the light incident portion in the direction.

15. An illumination device comprising:

a light guide plate;

a plurality of light-emitting elements each having a light-emitting surface oriented to a side end face of the light guide plate which serves as a light incident portion and the plurality of light-emitting elements being arranged along the light incident portion;

a light source substrate extending along the light incident portion and having the plurality of light-emitting elements mounted on one side a light source support member made of a metal having a substrate holding surface which is in surface contact with an other side of the light source substrate and extends along the side end face, and the light source support member includes a support plate that contacts the light source substrate, a first frame being disposed on an outer side of the light source support member and the light guide plate and having a first side plate such that a closed space is formed along the light source support member between the first side plate of the first frame and the support plate; and an unobstructed opening through which the closed space communicates with an outside of the illumination device without interruption, the opening being formed on a second side plate that intersects an extended line of the closed space, wherein:

a first distance between the support plate of the light source support member and the first side plate of the first frame which faces the support plate of the light source support member in a direction that intersects the light source substrate is larger than a second distance between the one side of the light source substrate and the light incident portion in the direction.

16. A display device having an illumination device and a display panel that is disposed above a light exiting surface of the illumination device, the illumination device comprising:

a light guide plate;

a plurality of light-emitting elements that each have a light-emitting surface oriented to a side end face of the light guide plate which serves as a light incident portion, and the plurality of light-emitting elements are arranged along the light incident portion;

a light source substrate that has the plurality of light-emitting elements mounted on one side thereof and extending along the light incident a light source support member made of a metal that extends along the side end face, and has a substrate holding surface which is in surface contact with an other side of the light source substrate, and the light source support member includes a support plate that contacts the light source substrate, a first frame that is disposed on an outer side of the light source support member and the light guide plate and has a first side plate such that a closed space is formed along the light source support member between the first side plate of the first frame and the support plate, wherein:

the illumination device has an unobstructed opening through which the closed space communicates with an outside of the illumination device without interruption, the opening being formed by at least one opening portion, the opening being formed on a second side plate that intersects an extended line of the closed space, and a first distance between the support plate of the light source support member and the first side plate of the first frame which faces the support plate of the light source support member in a direction that intersects the light source substrate is larger than a second distance between the substrate holding surface of the light source support member and the light incident portion in the direction.

17. An illumination device comprising:

a light guide plate;

a plurality of light-emitting elements having a light-emitting surface oriented to a side end face of the light guide plate which serves as a light incident portion and the plurality of light-emitting elements being arranged along the light incident portion;

a light source substrate extending along the light incident portion and having the plurality of light-emitting elements mounted on one side a light source support member made of a metal having a substrate holding surface which is in surface contact with an other side of the light source substrate and extends along the light incident portion, and the light source support member includes a support plate that contacts the light source substrate, a first frame being disposed on an outer side of the light source support member and the light guide plate and having a first side plate such that a closed space is formed along the light source support member between the first side plate of the first frame and the support plate, and an unobstructed opening through which the closed space communicates with an outside of the illumination device without interruption, the opening being formed on a second side plate that intersects an extended line of the closed space, wherein:

a first distance between the support plate of the light source support member and the first side plate of the first frame which faces the support plate of the light source support member in a direction that intersects the light source substrate is larger than a second distance between the substrate holding surface of the light source support member and the light incident portion in the direction.

18. The display device according to claim 1, wherein an upper plate extends from the first support plate so that the upper plate and the first support plate form an L-shape, and a lower plate extends from the first support plate in a first direction and a second direction, the first direction being the direction away from the light guide plate and the second direction being opposite the first direction so that the lower plate and the first support plate form a T-shape.

* * * * *